United States Patent
Ruiz et al.

(10) Patent No.: US 12,406,689 B2
(45) Date of Patent: Sep. 2, 2025

(54) NOTCHED HEAD DESIGN FOR TAPE APPLICATIONS

(71) Applicant: Western Digital Technologies, Inc., San Jose, CA (US)

(72) Inventors: Oscar J. Ruiz, San Jose, CA (US); Kenji Kuroki, Fujisawa (JP); Eduardo Torres Mireles, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/384,160

(22) Filed: Oct. 26, 2023

(65) Prior Publication Data

US 2025/0140283 A1  May 1, 2025

(51) Int. Cl.
  *G11B 5/187* (2006.01)
  *G11B 5/008* (2006.01)

(52) U.S. Cl.
  CPC .............. *G11B 5/187* (2013.01); *G11B 5/008* (2013.01)

(58) Field of Classification Search
  None
  See application file for complete search history.

(56) References Cited

U.S. PATENT DOCUMENTS

| | | | |
|---|---|---|---|
| 3,573,769 A * | 4/1971 | Flora | G11B 5/4893 |
| 6,118,626 A * | 9/2000 | Muftu | G11B 15/62 360/122 |
| 6,424,496 B1 | 7/2002 | Kaiser et al. | |
| 6,433,959 B1 * | 8/2002 | Lakshmikumaran | G11B 5/10 |
| 7,256,963 B2 * | 8/2007 | Saliba | G11B 5/1871 29/603.12 |
| 8,009,386 B2 * | 8/2011 | Hachisuka | G11B 5/1871 360/122 |
| 8,451,561 B2 * | 5/2013 | Yano | G11B 5/1871 360/122 |

(Continued)

FOREIGN PATENT DOCUMENTS

| | | | |
|---|---|---|---|
| WO | WO-0237478 A2 * | 5/2002 | G11B 15/64 |
| WO | 2008089665 A1 | 7/2008 | |

OTHER PUBLICATIONS

Lantz, Mark A. et al., "Future Scaling Potential of Particulate Media in Magnetic Tape Recording", Handbook of Magnetic Materials, vol. 22, 2014, pp. 317-379, <http://dx.doi.org/10.1016/B978-0-444-63291-3.00003-9>.

*Primary Examiner* — William J Klimowicz
(74) *Attorney, Agent, or Firm* — PATTERSON + SHERIDAN, LLP

(57) ABSTRACT

In a tape drive comprising a tape head module, a tape contacts the tape head module during operation. The tape head module comprises a substrate, a plurality of data heads disposed adjacent to the substrate at a media facing surface (MFS), and a closure disposed adjacent to the plurality of data heads. The closure comprises a first side portion disposed at a leading edge, a second side portion disposed at the leading edge, the first and second side portions being recessed from the MFS, and a central portion disposed between the first and second side portions at the leading edge. In some embodiments, the central portion is recessed from the MFS. The central portion may comprise a notch, a taper, or one or more steps. The first and second side portions may be tapered, rounded, or comprise one or more steps to reduce contact of a tape during operation.

21 Claims, 17 Drawing Sheets

(56) References Cited

U.S. PATENT DOCUMENTS

| | | | |
|---|---|---|---|
| 8,542,460 B2* | 9/2013 | Biskeborn | G11B 5/584 |
| | | | 360/122 |
| 9,030,779 B2 | 5/2015 | Dellmann et al. | |
| 9,280,988 B1* | 3/2016 | Lakshmikumaran | G11B 5/41 |
| 9,449,619 B1 | 9/2016 | Biskeborn | |
| 9,691,414 B1* | 6/2017 | Biskeborn | G11B 5/3169 |
| 9,711,170 B1 | 7/2017 | Biskeborn et al. | |
| 9,734,854 B2* | 8/2017 | Engelen | G11B 5/00813 |
| 9,852,747 B1* | 12/2017 | Biskeborn | G11B 15/62 |
| 10,657,989 B1* | 5/2020 | Biskeborn | G11B 5/187 |
| 11,495,254 B2* | 11/2022 | Kuroki | G11B 25/063 |
| 2003/0021062 A1* | 1/2003 | Kanno | G11B 15/62 |
| 2008/0049358 A1 | 2/2008 | Biskeborn et al. | |
| 2009/0231757 A1* | 9/2009 | Biskeborn | G11B 5/1871 |
| | | | 360/122 |
| 2012/0300338 A1* | 11/2012 | Biskeborn | G11B 5/60 |
| | | | 360/75 |
| 2015/0055244 A1* | 2/2015 | Lakshmikumaran | |
| | | | G11B 5/3106 |
| | | | 360/122 |
| 2015/0364154 A1* | 12/2015 | Holmberg | G11B 15/62 |
| | | | 360/90 |
| 2016/0171998 A1 | 6/2016 | Biskeborn et al. | |
| 2019/0287555 A1* | 9/2019 | Biskeborn | G11B 5/60 |
| 2019/0341071 A1* | 11/2019 | Biskeborn | G11B 5/1871 |
| 2022/0059128 A1 | 2/2022 | Ruiz et al. | |

\* cited by examiner

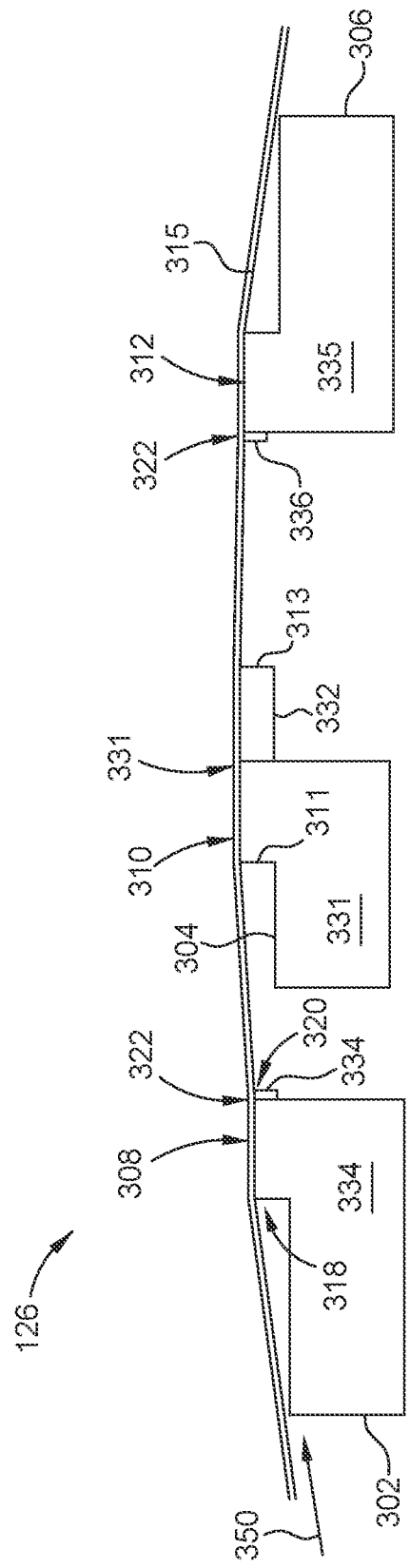

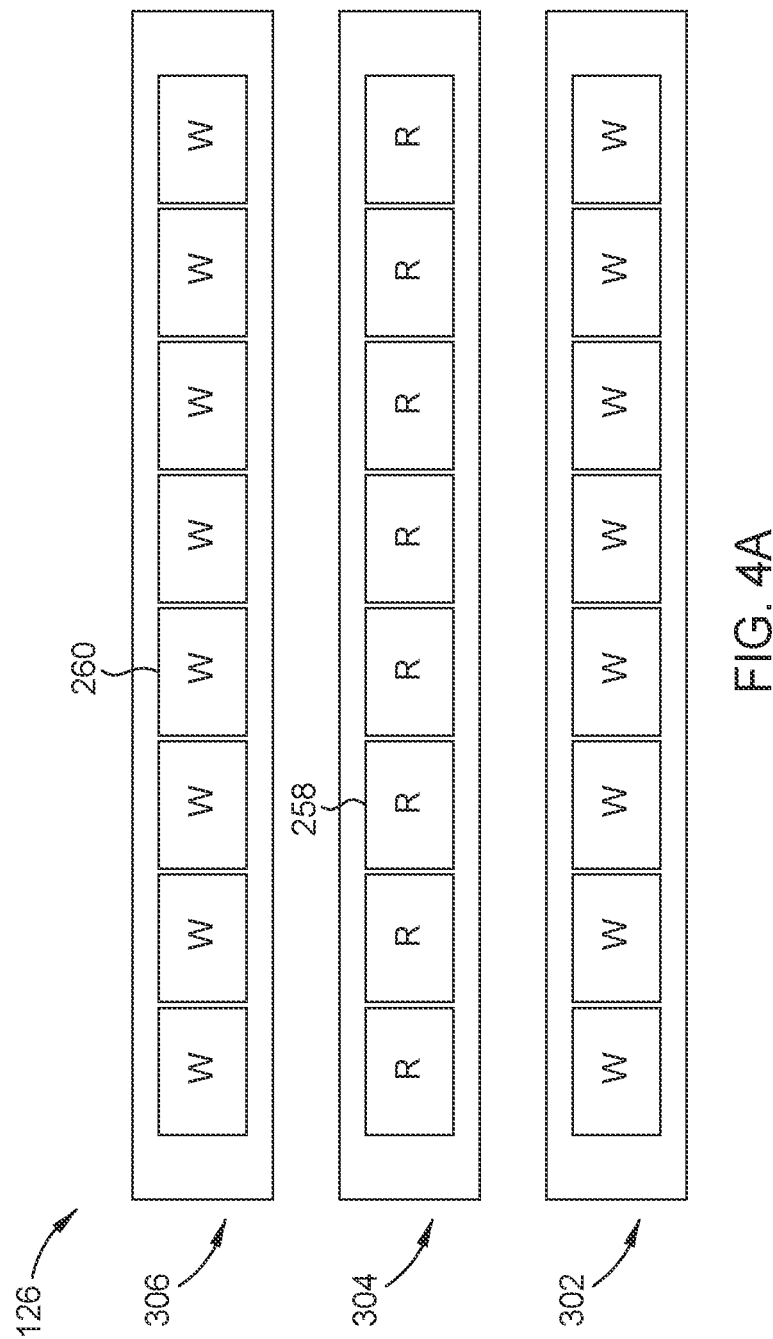

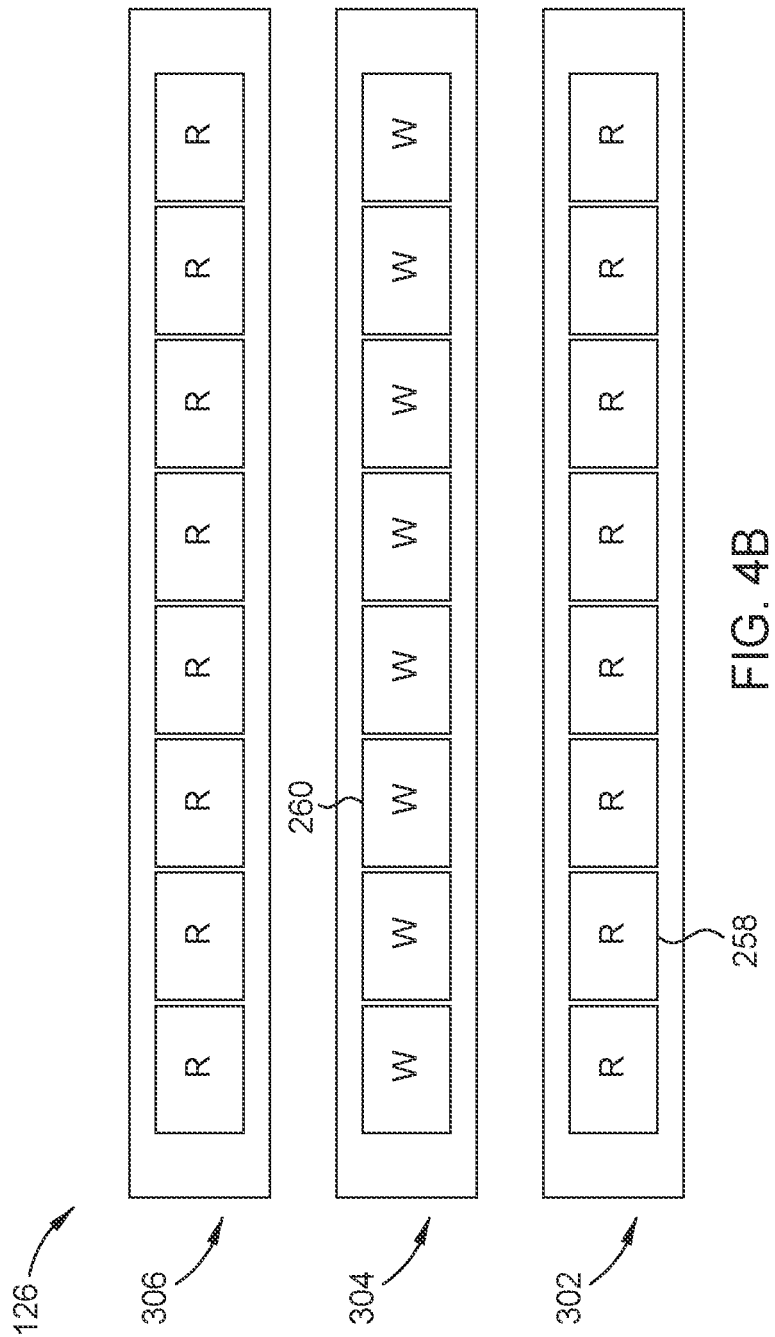

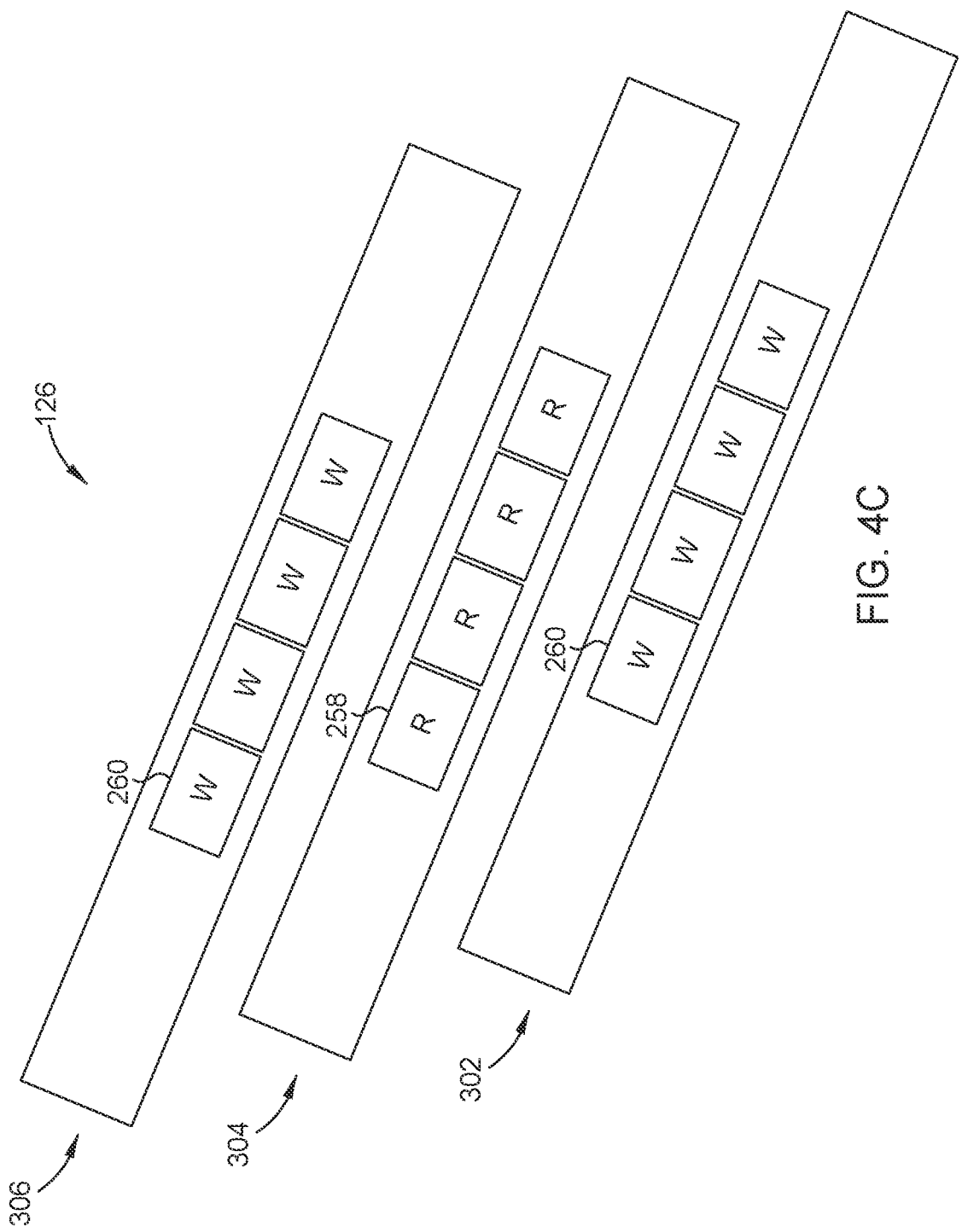

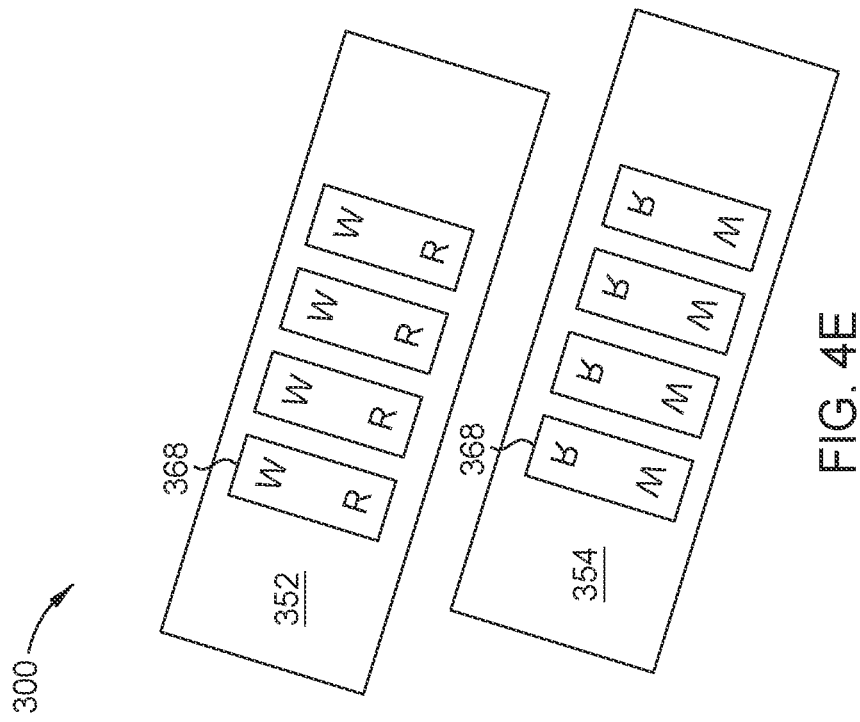
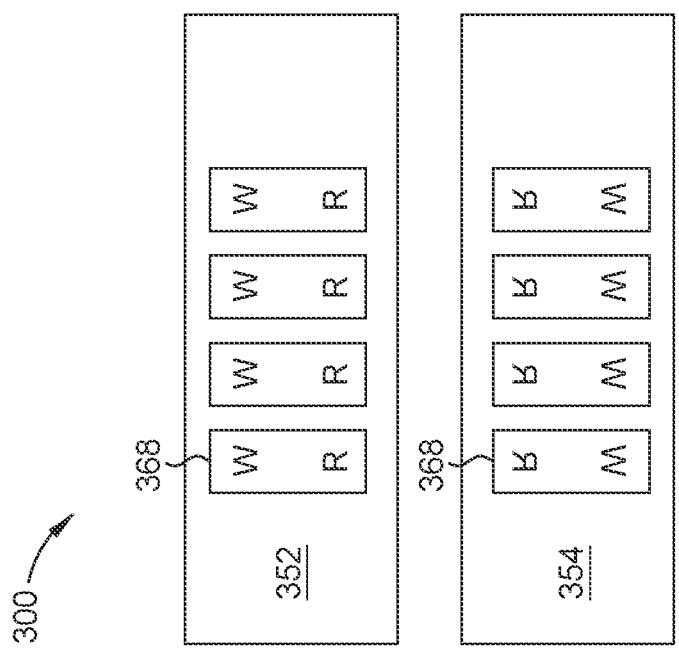

NOTCHED HEAD DESIGN FOR TAPE APPLICATIONS

BACKGROUND OF THE DISCLOSURE

Field of the Disclosure

Embodiments of the present disclosure generally relate to a tape drive comprising a tape head module.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

When writing data to or reading data from, the tape contacts the tape head or tape head module due to the roughness of the tape. However, such prolonged contact of the tape over the tape head module may cause friction or high contact force, damaging the tape. If the tape is damaged over time due to friction and/or the contact force exerted upon the tape, the data stored on the tape may be unreadable, and no new data may be written to the tape. As such, the overall lifetime of the tape is reduced.

Therefore, there is a need in the art for a tape head module that reduces friction and contact force exerted upon a tape during operation.

SUMMARY OF THE DISCLOSURE

In a tape drive comprising a tape head module, a tape contacts the tape head module during operation. The tape head module comprises a substrate, a plurality of data heads disposed adjacent to the substrate at a media facing surface (MFS), and a closure disposed adjacent to the plurality of data heads. The closure comprises a first side portion disposed at a leading edge, a second side portion disposed at the leading edge, the first and second side portions being recessed from the MFS, and a central portion disposed between the first and second side portions at the leading edge. In some embodiments, the central portion is recessed from the MFS. The central portion may comprise a notch, a taper, or one or more steps. The first and second side portions may be tapered, rounded, or comprise one or more steps to reduce contact of a tape during operation.

In one embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, the first side portion being recessed from the MFS, a second side portion disposed at the leading edge, the second side portion being recessed from the MFS, and a central portion disposed between the first and second side portions at the leading edge, the central portion comprising a notch.

In another embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, a second side portion disposed at the leading edge, wherein the first and second side portions each individually comprises a first step recessed from the MFS and a second step recessed from the MFS, and a central portion disposed between the first and second side portions at the leading edge, the central portion being at least partially recessed from the MFS.

In yet another embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, a second side portion disposed at the leading edge, wherein the first and second side portions each individually comprises a first step recessed from the MFS and a second step recessed from the MFS, and a central portion disposed between the first and second side portions at the leading edge, the central portion comprising a third step recessed from the MFS and a fourth step recessed from the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A illustrates a magnetic recording head according to one approach of the present disclosure that includes first, second and third modules each having a media facing surface, respectively, which may be flat, contoured, etc.

FIGS. 4A-4C illustrate various configurations for the first, second and third modules of FIG. 3A.

FIGS. 4D-4E illustrate various configurations for the first and second modules of FIG. 3B.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In a tape drive comprising a tape head module, a tape contacts the tape head module during operation. The tape head module comprises a substrate, a plurality of data heads disposed adjacent to the substrate at a media facing surface (MFS), and a closure disposed adjacent to the plurality of data heads. The closure comprises a first side portion disposed at a leading edge, a second side portion disposed at the leading edge, the first and second side portions being recessed from the MFS, and a central portion disposed between the first and second side portions at the leading edge. In some embodiments, the central portion is recessed from the MFS. The central portion may comprise a notch, a taper, or one or more steps. The first and second side portions may be tapered, rounded, or comprise one or more steps to reduce contact of a tape during operation.

Figure 1A:
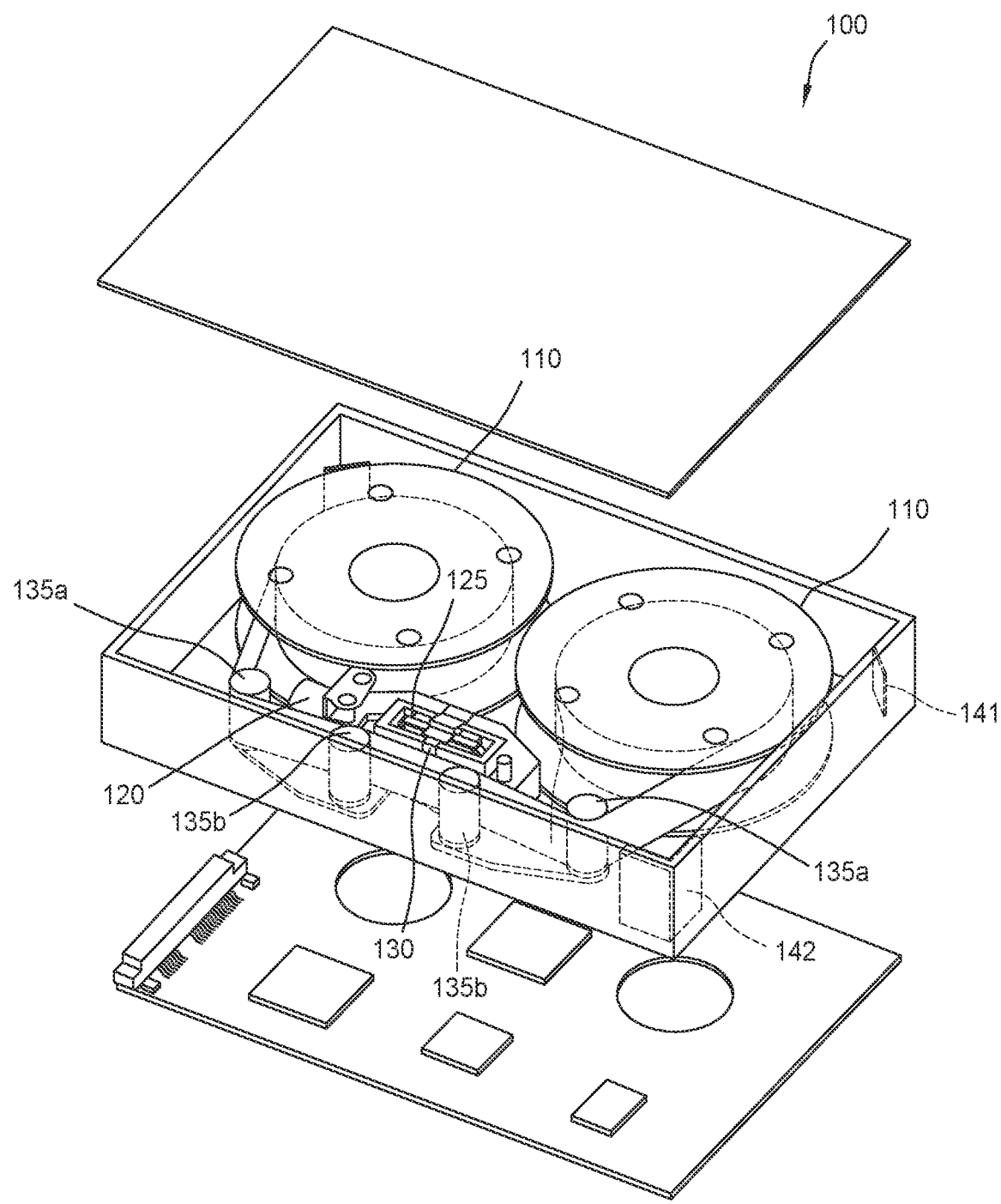
FIGS. 1A-1C illustrate a perspective exploded view, a simplified top down, and side profile view of a tape drive, in accordance with some embodiments.
Figure 1B:
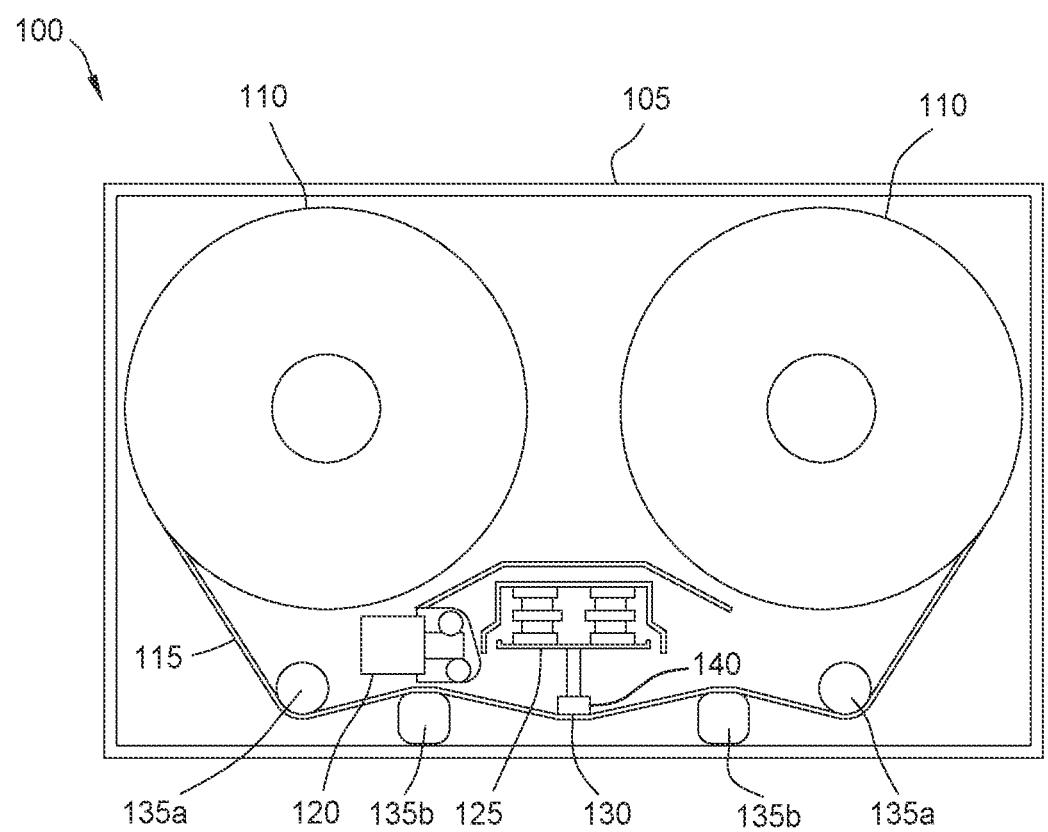
Figure 1C:
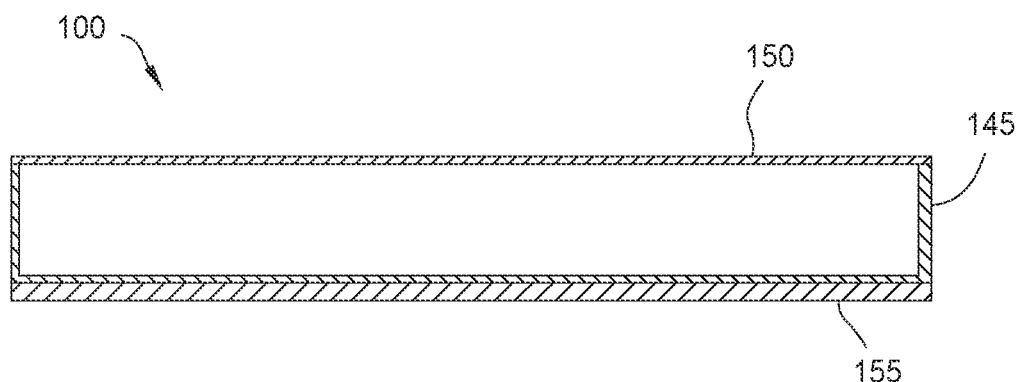

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115 by providing bending and extensional stiffness to the tape. The tape mead 115 operates under a given tension in its longitudinal direction.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b. The guide rollers 135a, 135b help maintain the tape aligned relative to head assembly 130 and reels 110. The guide rollers 135b are not co-lineal with head assembly 130. The shallow angle formed by the guide rollers 135a, 135b is called the wrap angle. The tape 115 is pressed against the head assembly 130 by virtue of the tape tension and the angle that results from the guide rollers 135b and head assembly 130 not being co-lineal.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
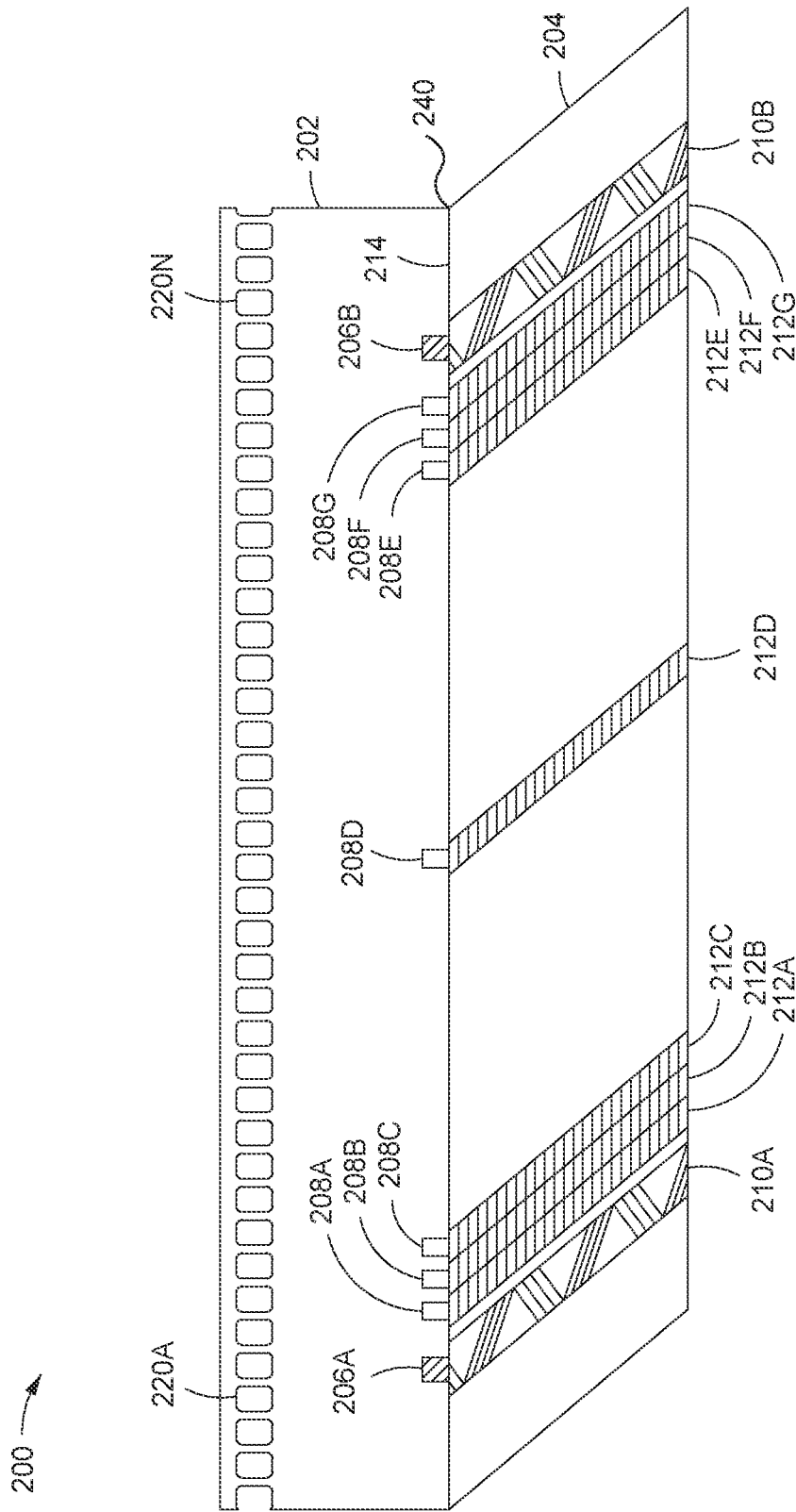
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

FIG. 3A illustrates a magnetic recording head 126 according to one approach of the present disclosure that includes first, second and third modules 302, 304, 306 each having a media facing surface 308, 310, 312 respectively, which may be flat, contoured, etc. FIGS. 4A-4C illustrate various configurations for the first, second and third modules 302, 304, 306 of FIG. 3A.

For explanation purposes, the first module 302, or the leading module 302, is the first module encountered by the tape 315 in a three module design for tape 315 moving in the indicated direction by arrow 350. The third module 306, or the trailing module 306, follows the middle module 304 and is the last module seen by the tape 315 in a three module design. The leading and trailing modules 302, 306 are referred to collectively as outer modules. Also note that the outer modules 302, 306 will alternate as leading modules, depending on the direction of travel of the tape 315.

In a write-read-write (W-R-W) head, outer modules for writing flank one or more inner modules for reading. FIG. 4A illustrates a W-R-W configuration, the outer modules 302, 306 each include one or more arrays of writers (W) 260. The inner module 304 of FIG. 4A includes one or more arrays of readers (R) 258 in a similar configuration. Variations of a multi-module head include a R-W-R head, like shown in FIG. 4B, a R-R-W head, a W-W-R head, etc. In yet other variations, one or more of the modules may have read/write pairs of transducers. While each module comprises 8 readers 258 or 8 writers 260, each module may include a greater number of readers 258 and/or writers 260. In other embodiments, like shown in FIG. 4C, each module 302, 304, 306 may individually be tilted at an angle of about ±3 degrees to about ±15 degrees, and each module 302, 304, 306 may be configured to dynamically tilt an angle of about ±0.1 degrees to about ±1 degree to adjust a track pitch to accommodate changes of a tape. The track pitch of the tape may vary due to creep, such as by temperature and storage duration. Tilting the modules 302, 304, 306 enables the modules 302, 304, 306 to accommodate for changes in the track pitch.

Writing and reading functions are performed by different modules at any given time. In one approach, the second module 304 includes a plurality of readers (such as the readers 258 of FIGS. 4A-4C) and optional servo readers 329 and no writers. The first and third modules 302, 306 include a plurality of writers 322 and no data readers, with the exception that the outer modules 302, 306 may include optional servo readers. The writers 322 may be the writers 260 of FIGS. 4A-4C. The servo readers may be used to position the head during reading and/or writing operations. The servo reader(s) on each module are typically located towards the end of the array of readers or writers.

In one approach, the media facing surfaces 308, 310, 312 of the first, second, and third modules 302, 304, 306 lie on about parallel planes, and the media facing surface 310 of the second module 304 is above the media facing surfaces 308, 312 of the first and third modules 302, 306. Such a configuration has the effect of creating the desired wrap angle of the tape 315 relative to the media facing surface 310 of the second module 304.

Where the media facing surfaces 308, 310, 312 lie along parallel or nearly parallel yet offset planes, the volume contained between the edge 318 and the tape 315 increases downstream to balance the tape bending stiffness and tension. Such volume increment causes the pressure of the fluid contained therein to reduce below atmospheric level. This low pressure brings the tape 315 adhered close to the media facing surface 308 of the leading module 302. A trailing edge 320 of the leading module 302 (the end from which the tape 315 leaves the leading module 302) is the approximate reference point which defines a wrap angle over the media facing surface 310 on the leading edge 311 of the second module 304. The tape 315 stays in close proximity to the media facing surface 308 until close to the trailing edge 320 of the leading module 302. Accordingly, the writers 322 may be located near the trailing edges of the outer modules 302, 306.

Beneficially, the inner wrap angle on the leading edge 311 of the module 304 receiving the tape 315 will be larger than the inner wrap angle on the trailing edge 313, as the tape 315 rides above the trailing module 306. This difference is generally beneficial as a smaller inner wrap angle on the trialing edge 313 tends to oppose what has heretofore been a steeper exiting effective wrap angle.

The media facing surfaces 308, 312 of the outer modules 302, 306 are positioned to achieve a negative wrap angle at the trailing edge 320 of the leading module 302. This is generally beneficial in helping to reduce friction due to low contact pressure with the trailing end 320. Further, at the trailing module 306, the tape 315 flies over the media facing surface 312 with a relatively large clearance so there is virtually no contact pressure nor wear on the elements when tape is moving in this direction. Particularly, the tape 315 entrains air and so will not significantly ride on the media facing surface 312 of the third module 306 (some contact may occur). This is permissible, because the leading module 302 is writing while the trailing module 306 is idle.

As shown in FIG. 3A, the first, second, and third modules 302, 304, 306 each have a closure 332, 334, 336, and a substrate 331, 333, 335, each of which extends the media facing surface of the associated module, thereby effectively positioning the read/write elements away from the edge of the media facing surface. The closures 332, 334, 336 can be a ceramic closure of a type typically found on tape head modules. The closures 334, 336 of the first and third modules 302, 306, however, may be shorter than the closure 332 of the second module 304 as measured parallel to a direction of tape travel over the respective module. This enables positioning the modules closer together.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Figure 3B:
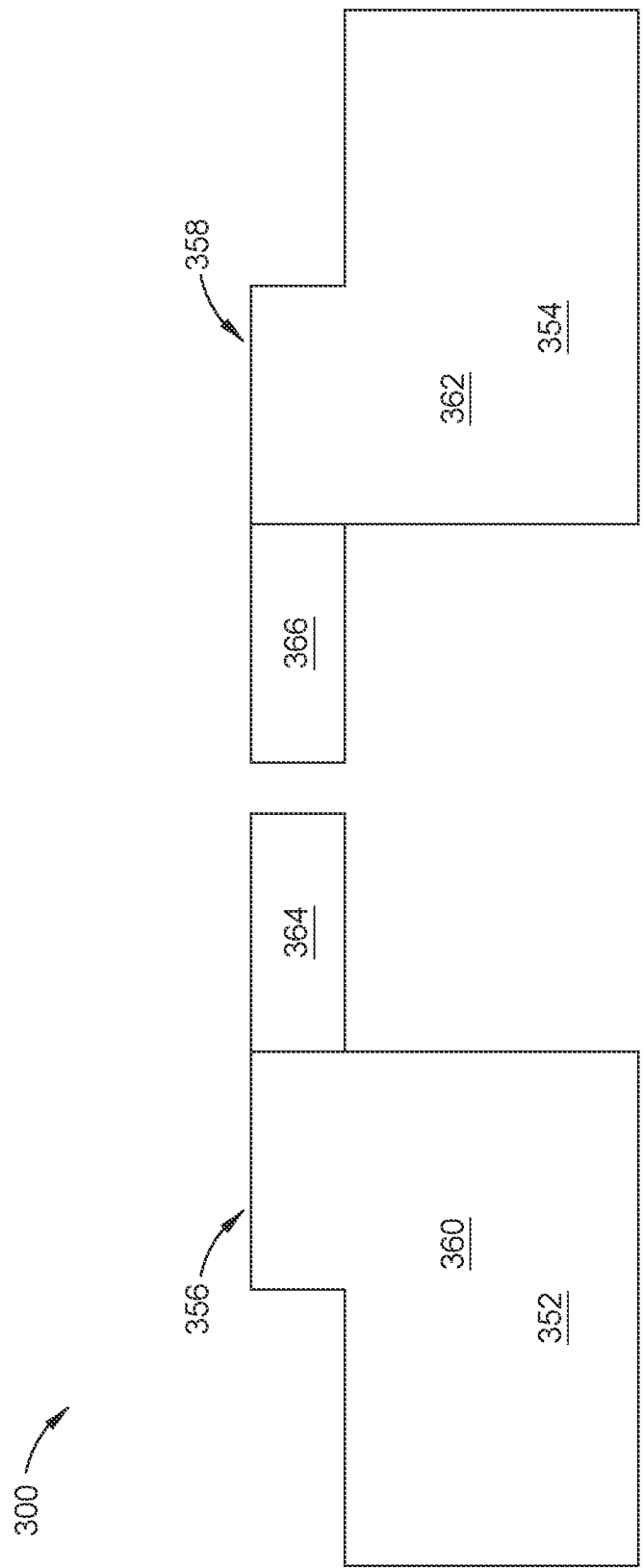
FIG. 3B illustrates a magnetic recording head according to another approach of the present disclosure that includes first and second modules.

FIG. 3B illustrates a magnetic recording head 300 according to another approach of the present disclosure that includes first and second modules 352, 354, each having a media facing surface 356, 358, respectively, which may be flat, contoured, etc. FIGS. 4D-4E illustrate various configurations for the first and second modules 352, 354, of FIG. 3B.

The magnetic recording head 300 of FIG. 3B is similar to the magnetic recording head 126 of FIG. 3A; however, the magnetic recording head 300 comprises only a first module 352 and a second module 354. The first module 352 comprises a closure 364 and a substrate 360, where the top or upper surfaces of the closure 364 and the substrate 360 form the MFS 356. The second module 354 comprises a closure 366 and a substrate 362, where the top or upper surfaces of the closure 362 and the substrate 366 form the MFS 358.

The magnetic recording head 300 of FIG. 3B is similar to the magnetic recording head 126 of FIG. 3A; however, the magnetic recording head 300 comprises only a first module 352 and a second module 354. The first module 352 comprises a closure 360 and a substrate 364, where the top or upper surfaces of the closure 360 and the substrate 364 form the MFS 356. The second module 354 comprises a closure 362 and a substrate 366, where the top or upper surfaces of the closure 362 and the substrate 366 form the MFS 358.

As shown in the MFS views of FIGS. 4D and 4E, the modules 352, 354 each individually comprise a plurality of data heads 368 or data elements. Each data head 368 comprises a write head and a read head. Thus, each module 352, 354 is able to both write data to and read data from a tape. While each module comprises 4 data heads 368, each module may include a greater number of readers 258 and/or writers 260.

In some embodiments, when a tape moves over the magnetic recording head 300 in a first direction, the first module 352 is controllable to write data to the tape while the second module 354 is controllable to read data from the tape. When the tape moves over the magnetic recording head 300 in a second direction opposite the first direction, the second module 354 is controllable to write data to the tape while the first module 352 is controllable to read data from the tape. Each module 352, 354 may be tilted at an angle of about ±3 degrees to about ±15 degrees, as shown in FIG. 4E, and each module 352, 354 may be configured to dynamically tilt an angle of about ±0.1 degrees to about ±1 degree to adjust a track pitch to accommodate changes of a tape. The track pitch of the tape may vary due to creep, such as by temperature and storage duration. Tilting the modules 352, 354 enables the modules 352, 354 to accommodate for changes in the track pitch.

FIGS. 5A-11B illustrate modules 500, 600, 700, 800, 900, 1000, 1100, of tape head assemblies, according to various embodiments. Each module 500, 600, 700, 800, 900, 1000, 1100 may be a module 302, 304, and/or 306 of the magnetic recording head 126 of FIG. 3A. Each module 500, 600, 700, 800, 900, 1000, 1100 may be a module 352 and/or 354 of the magnetic recording head 300 of FIG. 3B. Aspects of the modules may be used with one another.

Each module 500, 600, 700, 800, 900, 1000, 1100 comprises a closure 502, 602, 702, 802, 902, 1002, 1102, respectively, a substrate 504, 604, 704, 804, 904, 1004, 1104, respectively, and a recession 506, 606, 706, 806, 906, 1006, 1106, respectively. The read heads and/or write heads (not shown) of each module 500, 600, 700, 800, 900, 1000, 1100 are disposed within the recession 506, 606, 706, 806, 906, 1006, 1106.

The closures 502, 602, 702, 802, 902, 1002, 1102 may be a closure 332, 334, 336 of the magnetic recording head 126 of FIG. 3A. The substrates 504, 604, 704, 804, 904, 1004, 1104 may be a substrates 331, 333, and/or 335 of the magnetic recording head 126 of FIG. 3A. The closures 502, 602, 702, 802, 902, 1002, 1102 may be a closure 364, 366 of the magnetic recording head 300 of FIG. 3B. The substrates 504, 604, 704, 804, 904, 1004, 1104 may be a substrates 364, 366, of the magnetic recording head 300 of FIG. 3B. In some embodiments, aspects of the closures 502, 602, 702, 802, 902, 1002, 1102 may be apply to the substrates 504, 604, 704, 804, 904, 1004, 1104. While not explicitly described, a substrate can have the shaping features in the disclosed closures described below. In embodiments comprising one or more modules, such as described in FIGS. 3A-3B and 4A-4E, each closure and/or substrate may have the features of the closures 502, 602, 702, 802, 902, 1002, 1102 described below.

Figure 5A:
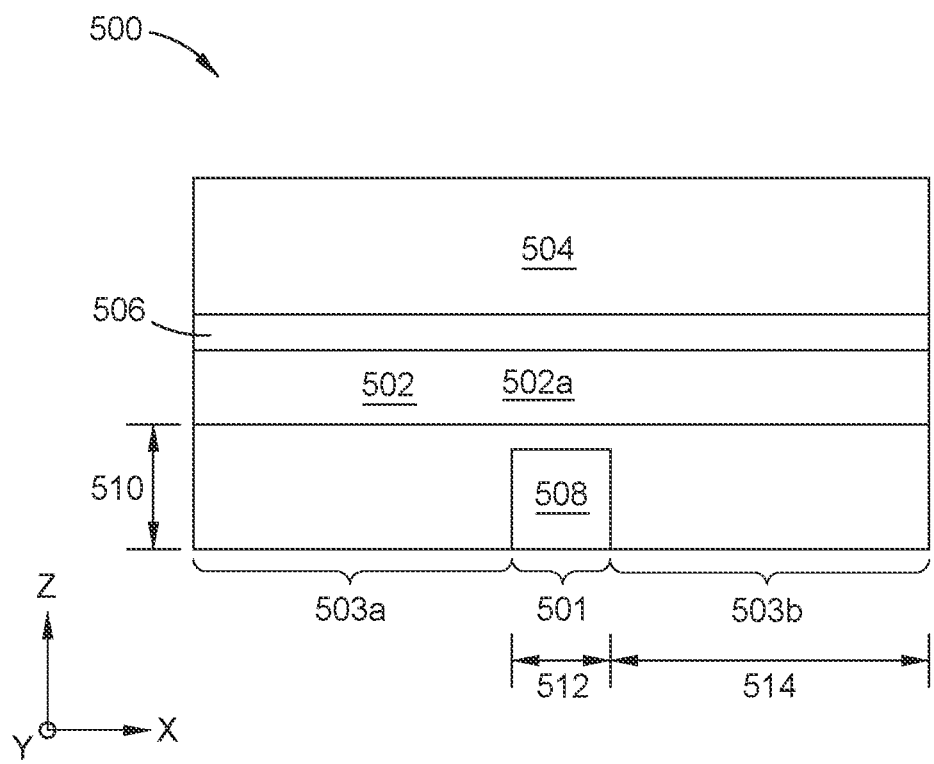
FIG. 5A illustrates a media facing surface (MFS) view of the module, according to one embodiment.
Figure 5B:
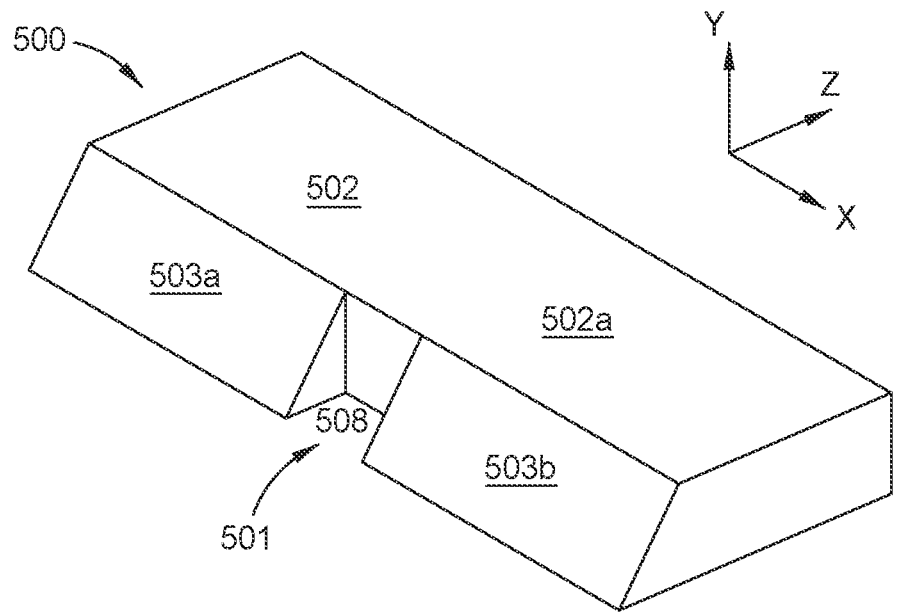
FIG. 5B illustrates a perspective view of the module of FIG. 5A.

FIG. 5A illustrates a media facing surface (MFS) view of the module 500, according to one embodiment. FIG. 5B illustrates a perspective view of the module 500 of FIG. 5A, according to one embodiment.

The closure 502 comprises a top surface 502a disposed at the MFS, a first side region 503a, a second side region 503b, and a central region 501 disposed between the first and second side regions 503a, 503b. The central region 501 and the side regions 503a, 503b may be disposed at a leading edge of the closure 502 (and/or substrate 504) and/or a trailing edge of the closure 502 (and/or substrate 504). The top surface 502a is substantially flat or planar. The closure 502 has a depth 510 in the z-direction of about 10 μm to about 150 μm. Each side region 503a, 503b has a length 514 in the x-direction of about 4 mm to about 10 mm. The central region 501 has a length 512 in the x-direction of about 0.8 mm to about 5 mm, such as about 3 mm. The closure 502 has a total length in the x-direction of about 20 mm to about 25 mm.

The central region 501 is the active region where the read heads and/or write heads of the module 500 are located. The central region 501 comprises a cutout, via, or notch 508, as shown in FIG. 5B, where the notch 508 has the same length 512 as the central region 501. The notch 508 is disposed at an angle of about 5 degrees to about 90 degrees with respect to the MFS. As further shown in FIG. 5B, the side regions 503a, 503b (collectively referred to herein as side regions 503) are both tapered or beveled such that the side regions 503 are angled downwards with respect to the MFS at an angle of about 0.1 degrees to about 5 degrees with respect to the MFS.

During operation, a tape (not shown) moves over the module in the z-direction and/or the −z-direction. As the tape moves over the module 500, the tapered side regions 503 increase the clearance between the side regions 503 and the tape while the notch 508 reduces the clearance between the tape and the central region 501 (i.e., where the read heads and/or write heads are located in the recession 506). The notch 508 of the central region 501 does not pressurize as much as the side regions 503, thus reducing the fly height or clearance of the tape over the central region 501. For example, the clearance between the tape and the side regions 503 in the y-direction is greater than about 100 nm, whereas the clearance between the tape and the central region 501 in the y-direction is about 10 nm. By utilizing the tapered side regions 503 and the notch 508 of the central region 501, friction and contact force exerted on the tape is minimized while the tape-to-head MFS clearance in the active region reaches an optimum level.

While only the closure 502 is shown as comprising the tapered side regions 503 and notch 508 of the central region 501, in some embodiments, the substrate 504 may instead comprise the tapered side regions 503 and notch 508. In other embodiments, both the closure 502 and the substrate 504 may comprise tapered side regions 503 and the notch 508.

Figure 6:
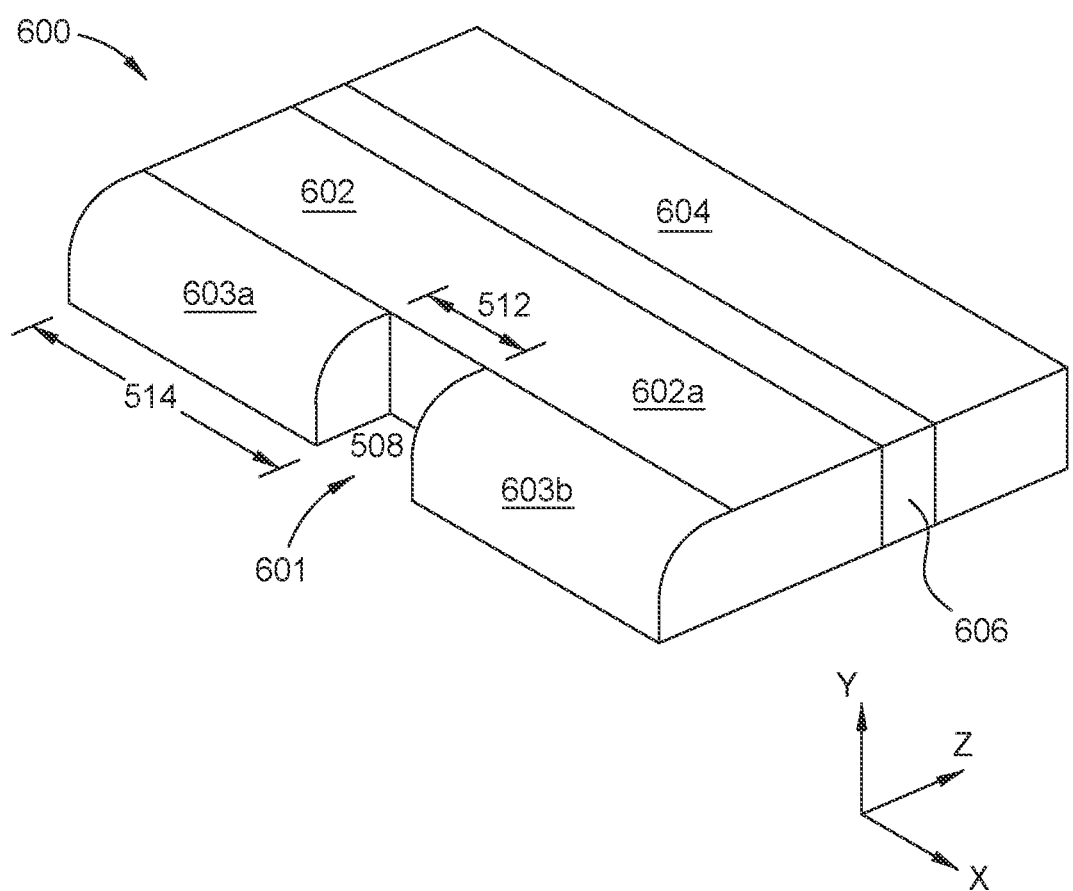
FIG. 6 illustrates a perspective view of a module, according to another embodiment.

FIG. 6 illustrates a perspective view of a module 600, according to another embodiment. The module 600 is similar to the module 500 of FIGS. 5A-5B; however, the side regions 603a, 603b of the module 600 are rounded, rather than tapered. The central region 601 comprises the notch 508, and the closure 602 comprises the substantially flat or planar top surface 602a disposed at the MFS. The side regions 603a, 603b have a radius of curvature of about 0.1 mm to about 10 mm. The central region 601 and the side regions 603a, 603b may be disposed at a leading edge of the closure 602 (and/or substrate 604) and/or a trailing edge of the closure 602 (and/or substrate 604).

As the tape moves over the module 600, the curved side regions 603a, 603b allow more air flow to enter under the tape and generate more pressure that increases the clearance between the side regions 603a, 603b and the tape while the notch 508 reduces the clearance between the tape and the central region 601 (i.e., where the read heads and/or write heads are located in the recession 606). The notch 508 of the central region 601 reduces the pressurization of the incoming air, thus reducing the fly height or clearance of the tape over the central region 601. For example, the clearance between the tape and the side regions 603a, 603b in the y-direction is greater than about 100 nm, whereas the clearance between the tape and the central region 601 in the y-direction is about 10 nm. By utilizing the curved side regions 603a, 603b and the notch 508 of the central region 601, friction and contact force exerted on the tape is minimized.

Figure 7:
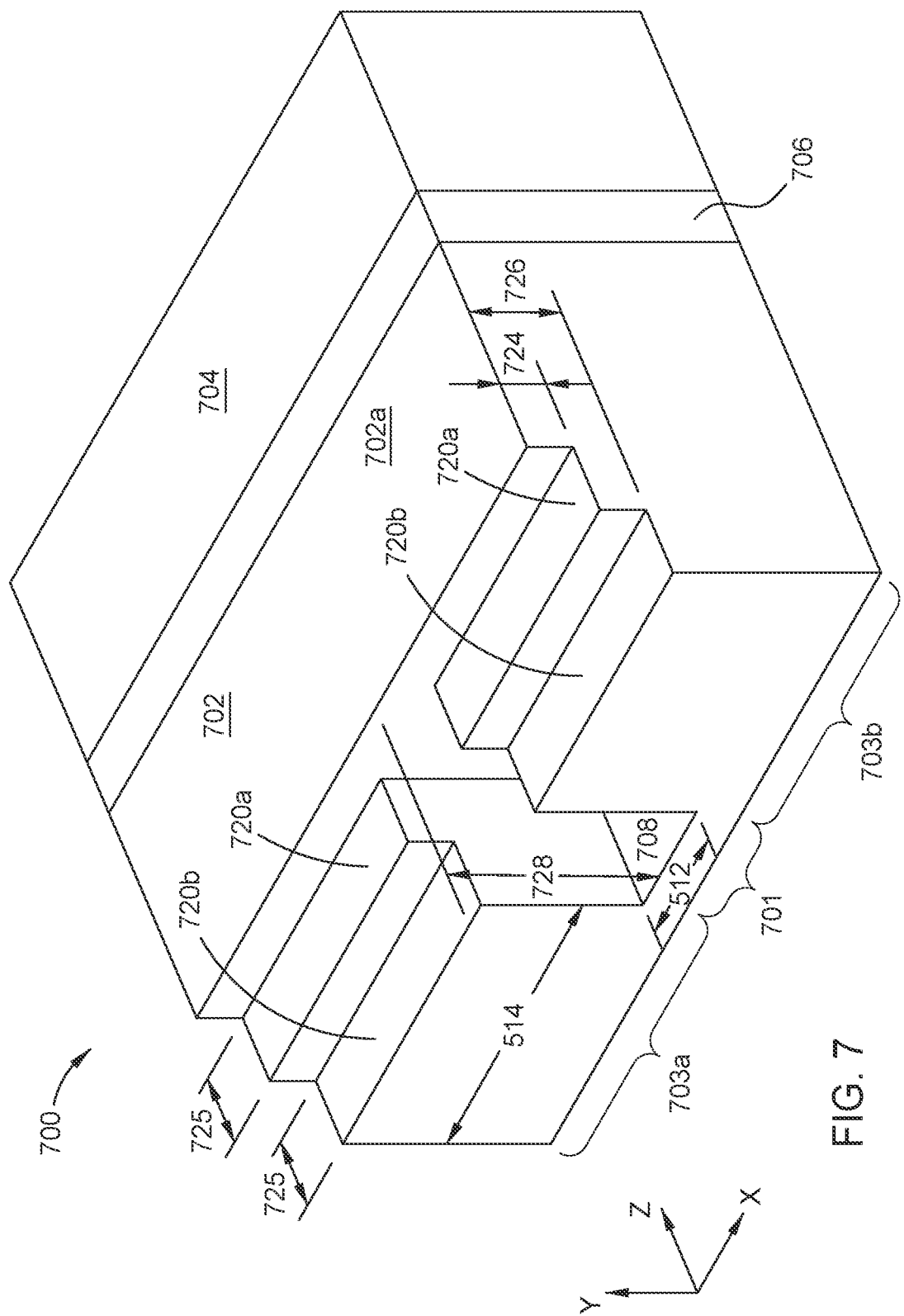
FIG. 7 illustrates a perspective view of a module, according to yet another embodiment.

FIG. 7 illustrates a perspective view of a module 700, according to yet another embodiment. The module 700 comprises a closure 702, which comprises a top surface 702a disposed at the MFS, a first side region 703a, a second side region 703b, and a central region 701 disposed therebetween. The central region 701 comprises a cutout or notch 708. The notch 708 is recessed by deep etching a distance 728 of about 0.5 µm to about 5 µm from the MFS. Each side region 703a, 703b comprises a first etched step 720a recessed a distance 724 of about 0.3 µm to about 1.0 µm from the MFS in the y-direction and a second etched step 720b recessed a distance 726 of about 0.5 µm to about 2.5 µm from the MFS in the y-direction. In other words, the side regions 703a, 703b comprise etched step-like features. Each step 720a, 720b has a width 725 in the z-direction of about 20 µm to about 150 µm. The central region 701 and the side regions 703a, 703b may be disposed at a leading edge of the closure 702 (and/or substrate 704) and/or a trailing edge of the closure 702 (and/or substrate 704).

As the tape moves over the module 700, the etched step-like side regions 703a, 703b increase the clearance between the side regions 703a, 703b and the tape while the etched notch 708 reduces the clearance between the tape and the central region 701 (i.e., where the read heads and/or write heads are located in the recession 706). The notch 708 of the central region 701 reduces the pressurization of the incoming air, thus reducing the fly height or clearance of the tape over the central region 701. For example, the clearance between the tape and the side regions 703a, 703b in the y-direction is greater than about 100 nm, whereas the clearance between the tape and the central region 701 in the y-direction is about 10 nm. By utilizing the etched step-like side regions 703a, 703b and the etched notch 708 of the central region 701, friction and contact force exerted on the tape is minimized.

Figure 8A:
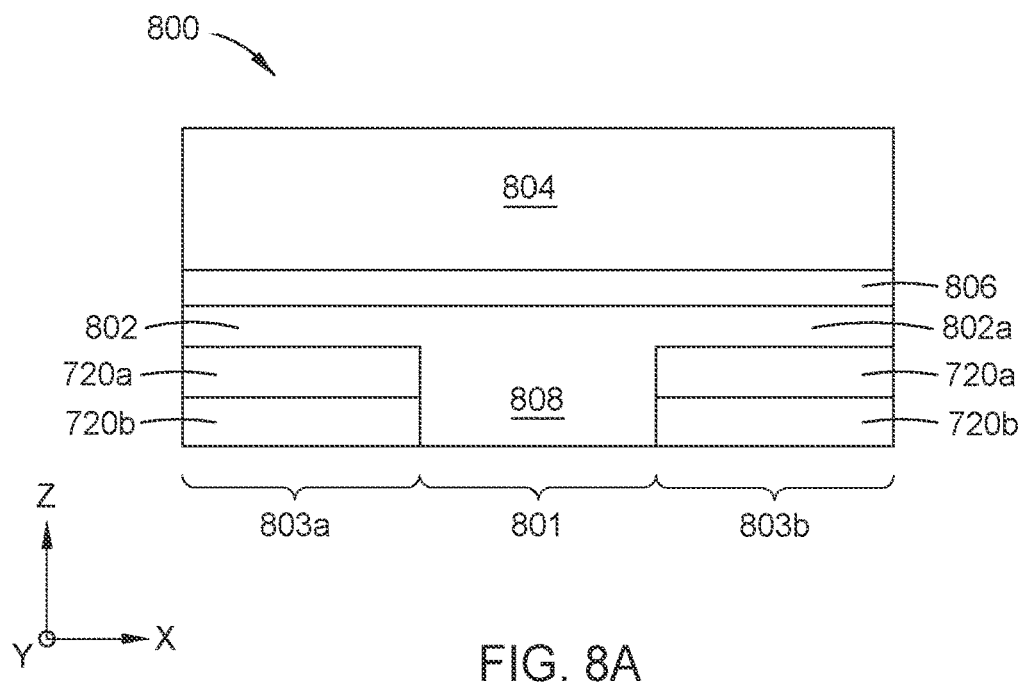
FIG. 8A illustrates a top-view of a module, according to one embodiment.
Figure 8B:
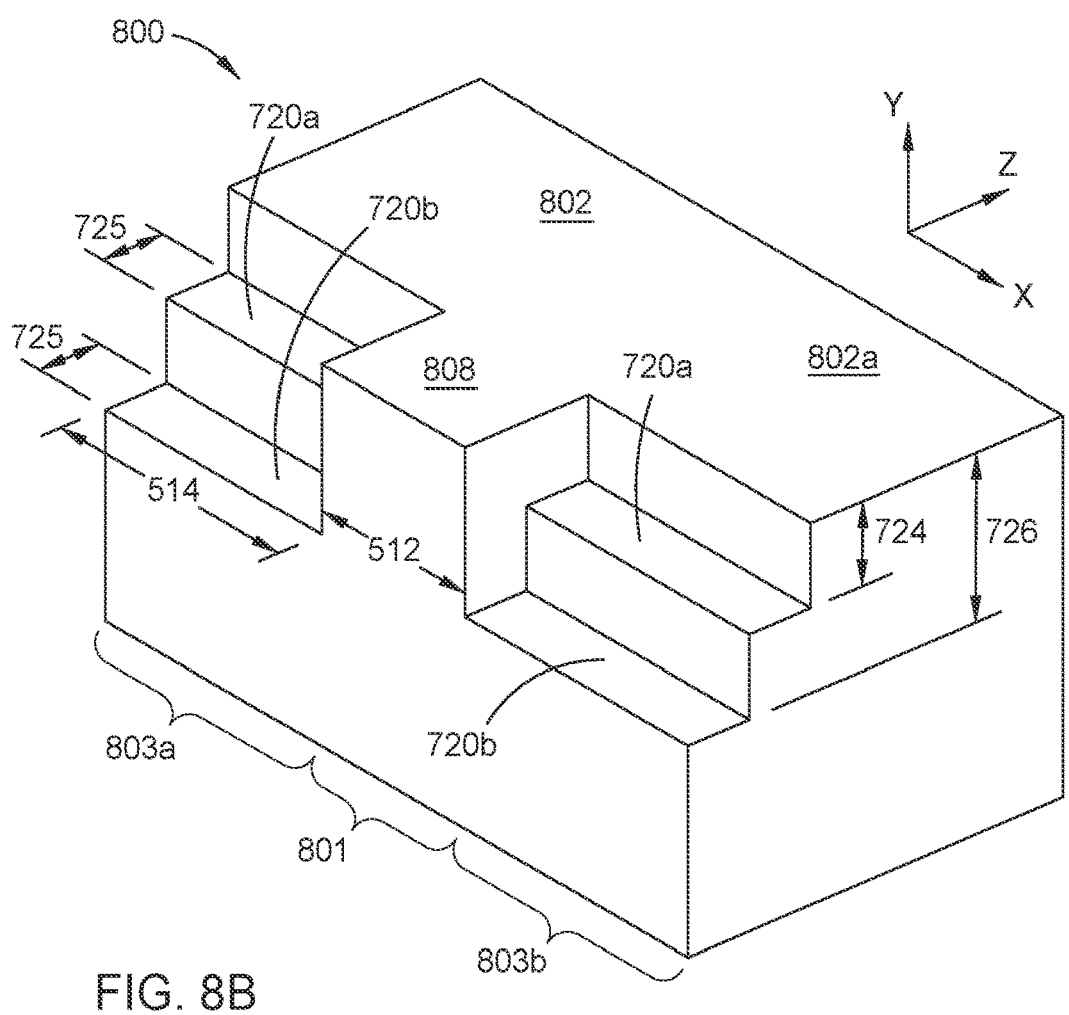
FIG. 8B illustrates a perspective view of the module of FIG. 8A.

FIG. 8A illustrates a top-view of a module 800, according to one embodiment. FIG. 8B illustrates a perspective view of the module 800 of FIG. 8A. The module 800 is similar to the module 700 of FIG. 7; however, the central region 801 is not recessed from the MFS. Rather, the central region 801 comprises a notch 808 disposed at the MFS and aligned with the top surface 802a of the module 800. The notch 808 is substantially flat or planar. Each side region 803a, 803b comprises the first step 720a recessed the distance 724 of about 0.2 µm to about 2.5 µm from the MFS in the y-direction and the second step 720b recessed the distance 726 of about 0.5 µm to about 5 µm from the MFS in the y-direction. In other words, the side regions 803a, 803b comprise etched step-like features. Each step 720a, 720b has a width 725 in the z-direction of about 10 µm to about 150 µm. The central region 801 and the side regions 803a, 803b may be disposed at a leading edge of the closure 802 (and/or substrate 804) and/or a trailing edge of the closure 802 (and/or substrate 804).

As the tape moves over the module 800, the stair-like side regions 803a, 803b pressure the air and increase the clearance between the side regions 803a, 803b and the tape while the notch 808 reduces the pressure and the clearance between the tape and the central region 801 (i.e., where the read heads and/or write heads are located in the recession 806). The notch 808 of the central region 801 reduces the pressurization of the air, thus reducing the fly height or clearance of the tape over the central region 801. For example, the clearance between the tape and the side regions 803a, 803b in the y-direction is greater than about 100 nm, whereas the clearance between the tape and the central region 801 in the y-direction is about 10 nm. By utilizing the stair-like side regions 803a, 803b and the notch 808 of the central region 801, friction and contact force exerted on the tape is minimized.

Figure 9A:
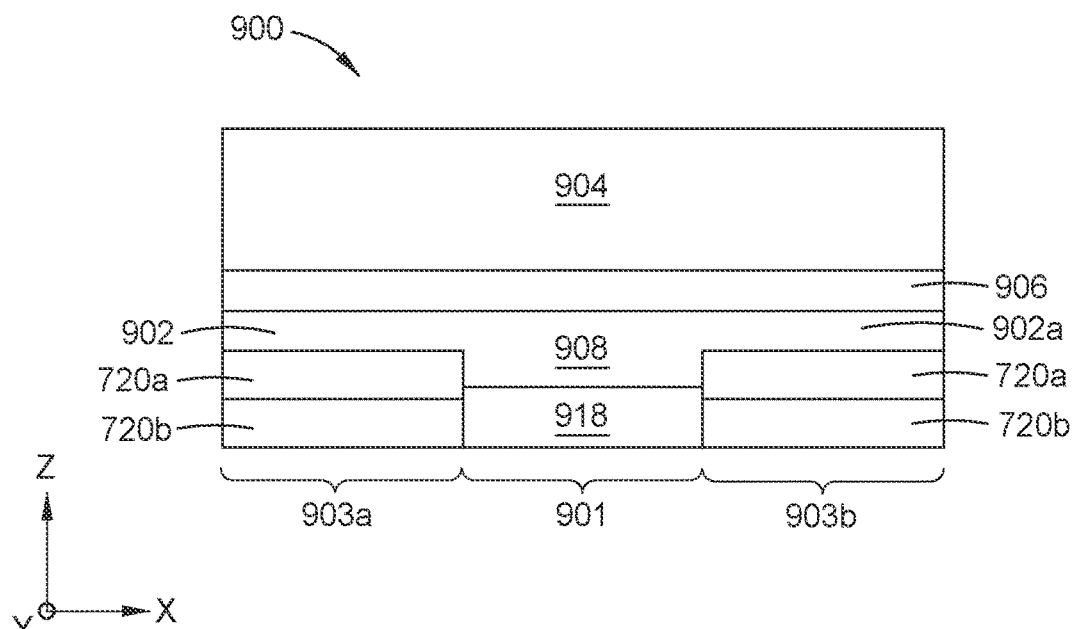
FIG. 9A illustrates a top-view of a module, according to another embodiment.
Figure 9B:
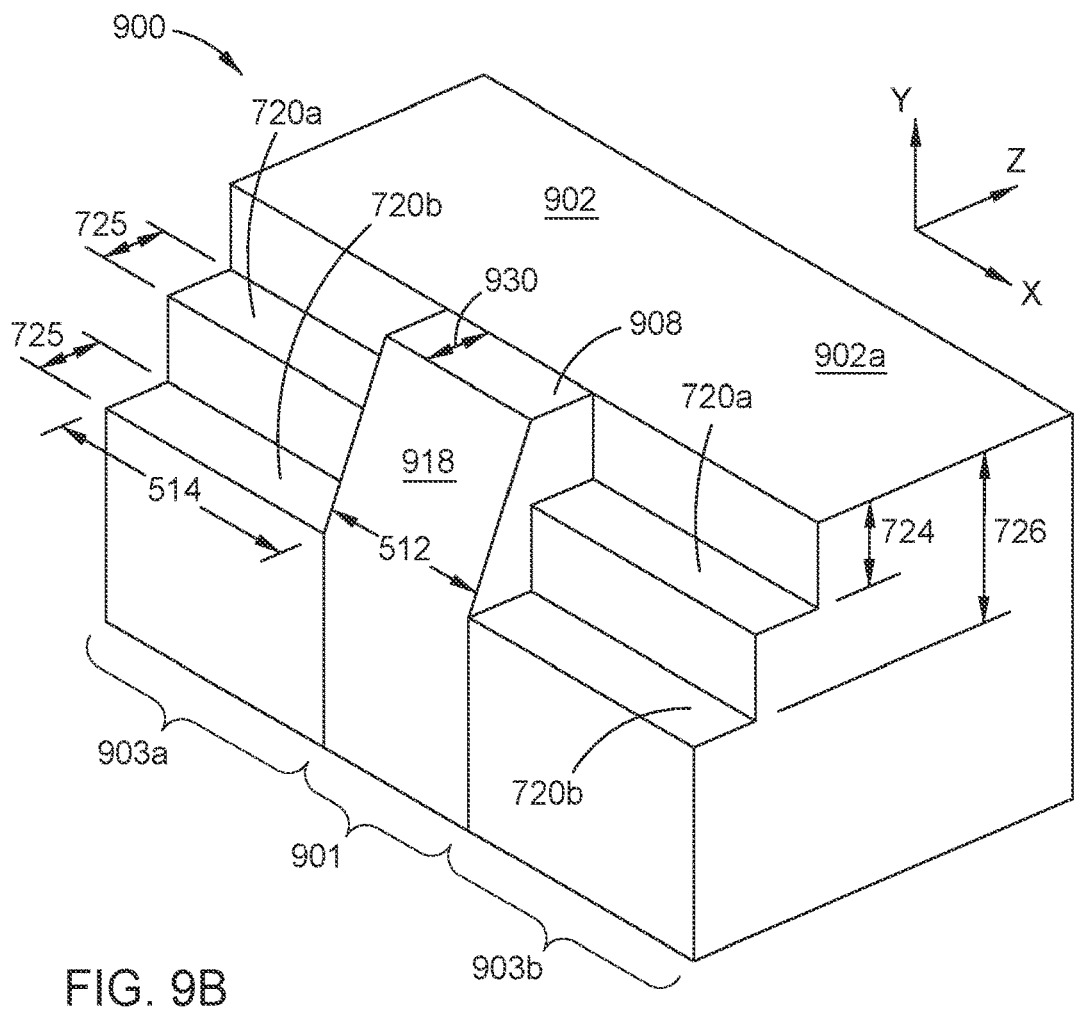
FIG. 9B illustrates a perspective view of the module of FIG. 9A.

FIG. 9A illustrates a top-view of a module 900, according to another embodiment. FIG. 9B illustrates a perspective view of the module 900 of FIG. 9A. The module 900 is similar to the module 800 of FIGS. 8A-8B; however, the central region 901 comprises a notch 908 disposed adjacent to and aligned with the top surface 902a of the closure 902 and a tapered portion 918. The tapered portion 918 extends from the notch 908 (i.e., the MFS) to a surface opposite the MFS at an angle of about 0.1 degrees to about 2 degrees, such as about 0.25 degrees, with respect to the MFS. The notch 908 is substantially flat or planar and has a width 930 in the z-direction of about 0 µm to about 100 µm (i.e., the notch 908 may be excluded in some embodiments).

Each side region 903a, 903b comprises the first step 720a recessed the distance 724 of about 0.2 µm to about 1.5 µm from the MFS in the y-direction and the second step 720b recessed the distance 726 of about 0.5 µm to about 5 µm from the MFS in the y-direction. In other words, the side regions 903a, 903b comprise etched step-like features. Each step 720a, 720b has a width 725 in the z-direction of about 10 µm to about 100 µm The central region 901 and the side regions 903a, 903b may be disposed at a leading edge of the closure 902 (and/or substrate 904) and/or a trailing edge of the closure 902 (and/or substrate 904).

As the tape moves over the module 900, the stair-like side regions 903a, 903b pressurize the air and increase the clearance between the side regions 903a, 903b and the tape while the notch 908 and tapered portion 918 reduce the clearance between the tape and the central region 901 (i.e., where the read heads and/or write heads are located in the recession 906). The notch 908 and tapered portion 918 of the central region 901 reduces the pressurization of incoming air, thus reducing the fly height or clearance of the tape over the central region 901. For example, the clearance between the tape and the side regions 903a, 903b in the y-direction is greater than about 100 nm, whereas the clearance between the tape and the central region 901 in the y-direction is about 10 nm. By utilizing the stair-like side regions 903a, 903b and the notch 908 and tapered portion 918 of the central region 901, friction and contact force exerted on the tape is minimized.

Figure 10A:
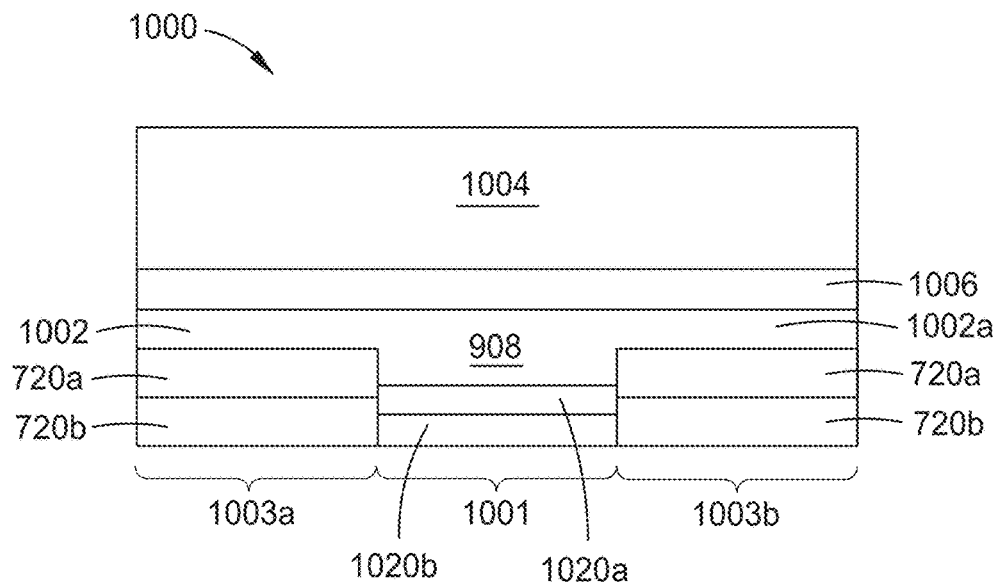
FIG. 10A illustrates a top-view of a module, according to yet another embodiment.
Figure 10B:
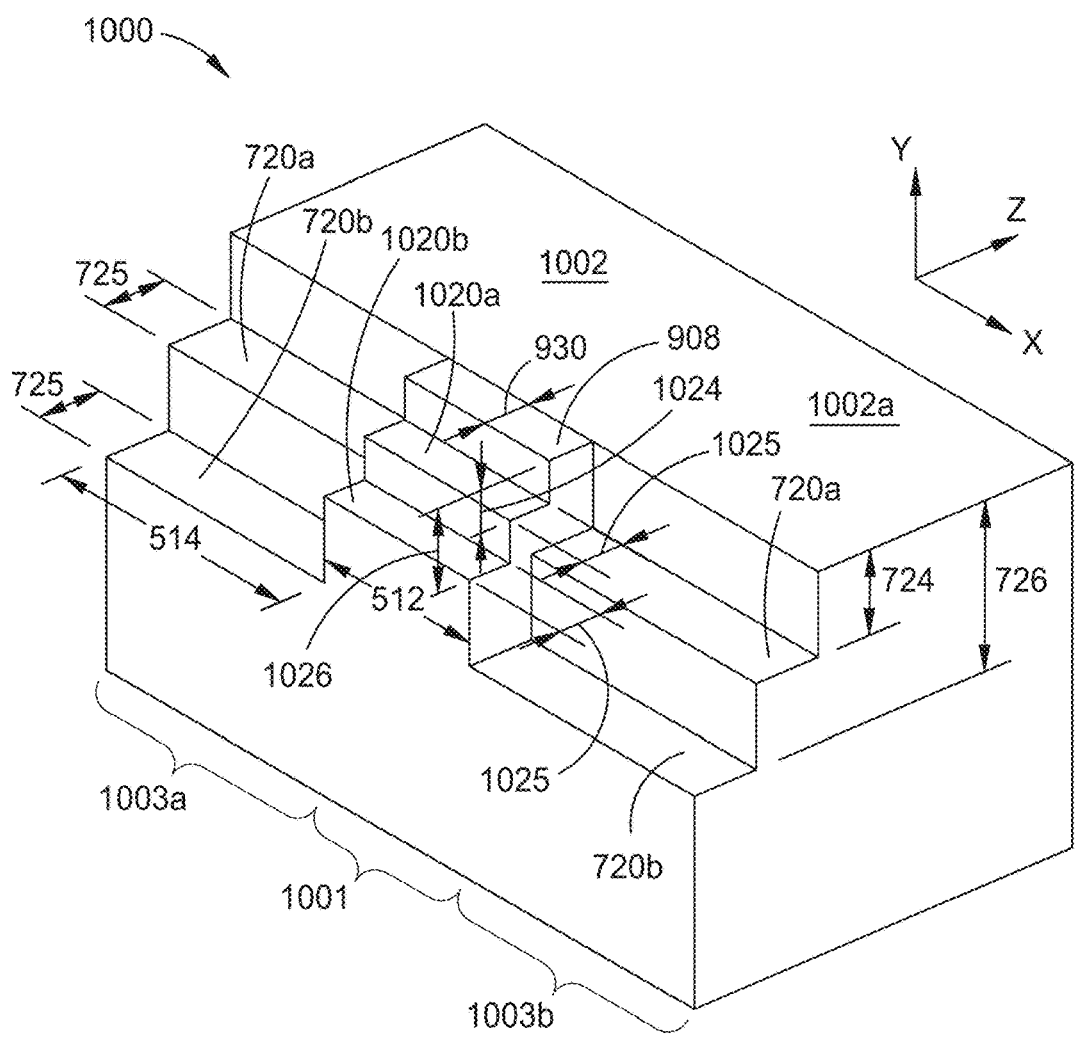
FIG. 10B illustrates a perspective view of the module of FIG. 10A.

FIG. 10A illustrates a top-view of a module 1000, according to yet another embodiment. FIG. 10B illustrates a perspective view of the module 1000 of FIG. 10A. The module 1000 is similar to the module 900 of FIGS. 9A-9B; however, the central regions 1001 comprises the notch 908 disposed adjacent to and aligned with the top surface 1002a of the closure 1002 and a third step 1020a and a fourth step 1020b. The notch 908 is substantially flat or planar and has a width 930 in the z-direction of about 0 µm to about 50 µm (e.g., the notch 908 may be excluded in some embodiments). The third step 1020a is recessed a distance 1024 in the y-direction of about 0.05 µm to about 0.5 µm, such as about 0.1 µm, from the MFS. The fourth step 1020b is recessed a distance 1026 in the y-direction of about 0.1 µm to about 1.0 µm, such as about 0.185 µm, from the MFS. Each step 1020a, 1020b has a width 1025 in the z-direction of about 0.1 µm to about 50 µm.

Each side region 1003a, 1003b comprises the first step 720a recessed the distance 724 of about 0.1 µm to about 2 µm from the MFS in the y-direction and the second step 720b recessed the distance 726 of about 0.5 µm to about 5 µm from the MFS in the y-direction. Thus, the third and fourth steps 1020a, 1020b are recessed a smaller distance 1024, 1026 from the MFS than the first and second steps 720a, 720b of the side regions 1003a, 1003b. Each step 720a, 720b has a width 725 in the z-direction of about 10 µm to about 100 µm. The central region 1001 and the side regions 1003a, 1003b may be disposed at a leading edge of the closure 1002 (and/or substrate 1004) and/or a trailing edge of the closure 1002 (and/or substrate 1004).

As the tape moves over the module 1000, the etched step-like side regions 1003a, 1003b pressurize the air and increase the clearance between the side regions 1003a, 1003b and the tape while the notch 908 and steps 1020a, 1020b reduce the clearance between the tape and the central region 1001 (i.e., where the read heads and/or write heads are located in the recession 1006). The notch 908 and steps 1020a, 1020b of the central region 1001 reduces the pressurization of incoming air, thus reducing the fly height or clearance of the tape over the central region 1001. For example, the clearance between the tape and the side regions 1003a, 1003b in the y-direction is greater than about 100 nm, whereas the clearance between the tape and the central region 1001 in the y-direction is about 10 nm. By utilizing the stair-like side regions 1003a, 1003b and the notch 908 and steps 1020a, 1020b of the central region 1001, friction and contact force exerted on the tape is minimized.

Figure 11A:
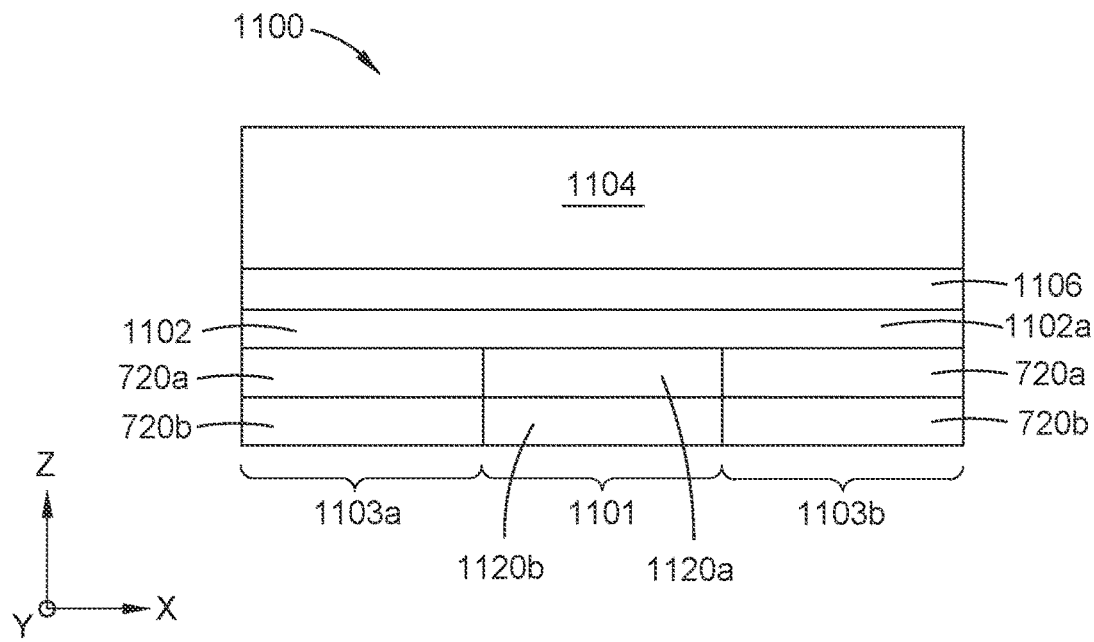
FIG. 11A illustrates a top-view of a module, according to another embodiment.
Figure 11B:
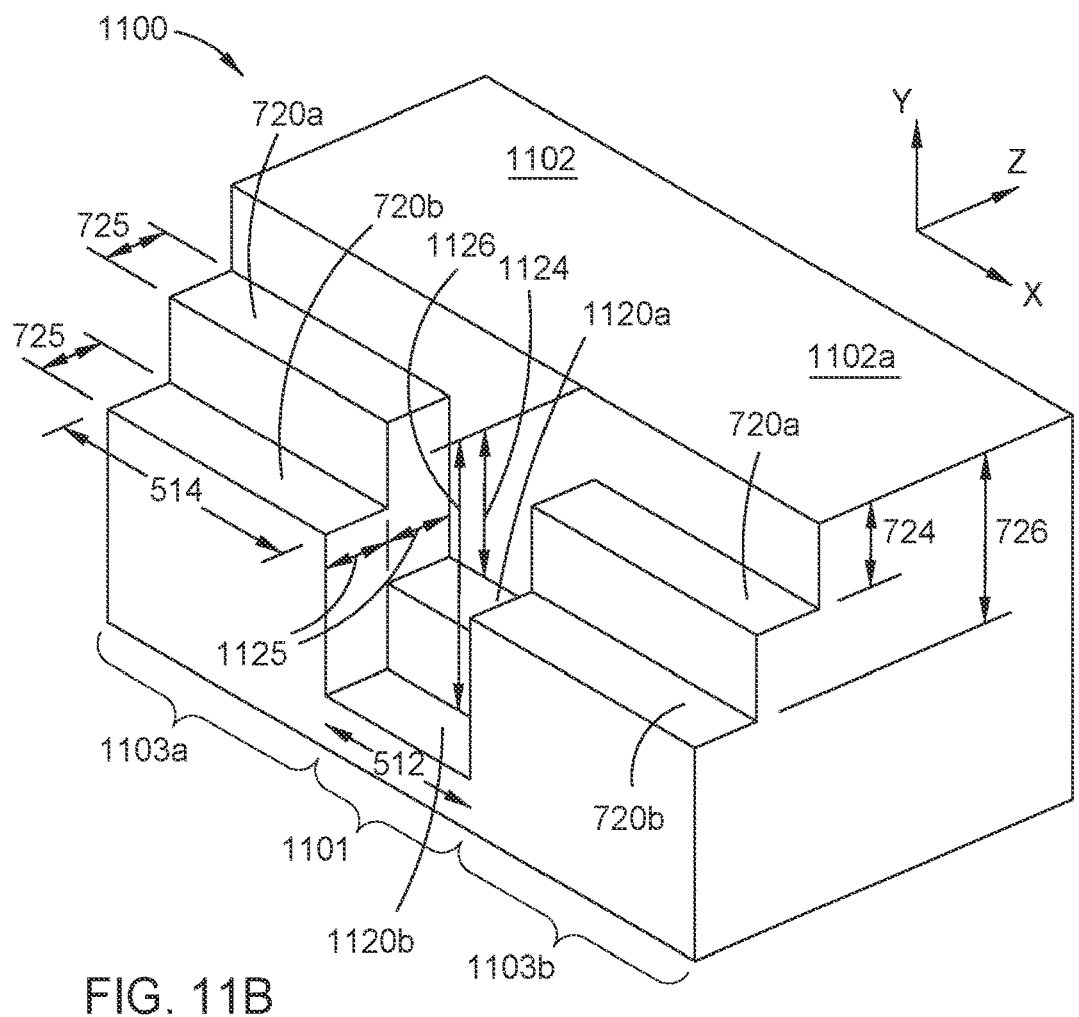
FIG. 11B illustrates a perspective view of the module of FIG. 11A.

FIG. 11A illustrates a top-view of a module 1100, according to another embodiment. FIG. 11B illustrates a perspective view of the module 1100 of FIG. 11A. The module 1100 is similar to the module 1000 of FIGS. 10A-10B; however, the central region 1101 does not comprise the notch 908 disposed adjacent to and aligned with the top surface 1102a of the closure 1102. Rather, the central region 1101 comprises a third step 1120a and a fourth step 1120b. The third step 1120a is recessed a distance 1124 in the y-direction of about 0.5 µm to about 2.5 µm from the MFS. The fourth step 1120b is recessed a distance 1126 in the y-direction of about 0.5 µm to about 2.5 µm from the MFS. Each step 1120a, 1120b has a width 1125 in the z-direction of about 10 µm to about 100 µm. Thus, comparing the third and fourth steps 1120a, 1120b of the closure 1102 to the third and fourth steps 1020a, 1020b of the closure 1002 of FIGS. 10A-10B, the third and fourth steps 1120a, 1120b are recessed further from the MFS than the third and fourth steps 1020a, 1020b. Both third and fourth steps 1020a, 1020b can be made with a single mask and have common depths.

Each side region 1103a, 1103b comprises the first step 720a recessed the distance 724 of about 0.2 µm to about 1.5 µm from the MFS in the y-direction and the second step 720b recessed the distance 726 of about 0.5 µm to about 5 µm from the MFS in the y-direction. Thus, the third and fourth steps 1120a, 1120b are recessed a greater distance 1124, 1126 from the MFS than the first and second steps 720a, 720b of the side regions 1103a, 1103b. Each step 720a, 720b has a width 725 in the z-direction of about 10 µm to about 100 µm. The central region 1101 and the side regions 1103a, 1103b may be disposed at a leading edge of the closure 1102 (and/or substrate 1104) and/or a trailing edge of the closure 1102 (and/or substrate 1104).

As the tape moves over the module 1100, the step-like side regions 1103a, 1103b pressurizes the air and increase the clearance between the side regions 1103a, 1103b and the tape while steps 1120a, 1120b reduce the clearance between the tape and the central region 1101 (i.e., where the read heads and/or write heads are located in the recession 1106). The steps 1120a, 1120b of the central region 1101 reduces the pressurization of incoming air, thus reducing the fly height or clearance of the tape over the central region 1101. For example, the clearance between the tape and the side regions 1103a, 1103b in the y-direction is greater than about 100 nm, whereas the clearance between the tape and the central region 1101 in the y-direction is about 10 nm. By utilizing the step-like side regions 1103a, 1103b and the steps 1120a, 1120b of the central region 1101, friction and contact force exerted on the tape is minimized.

Figure 12:
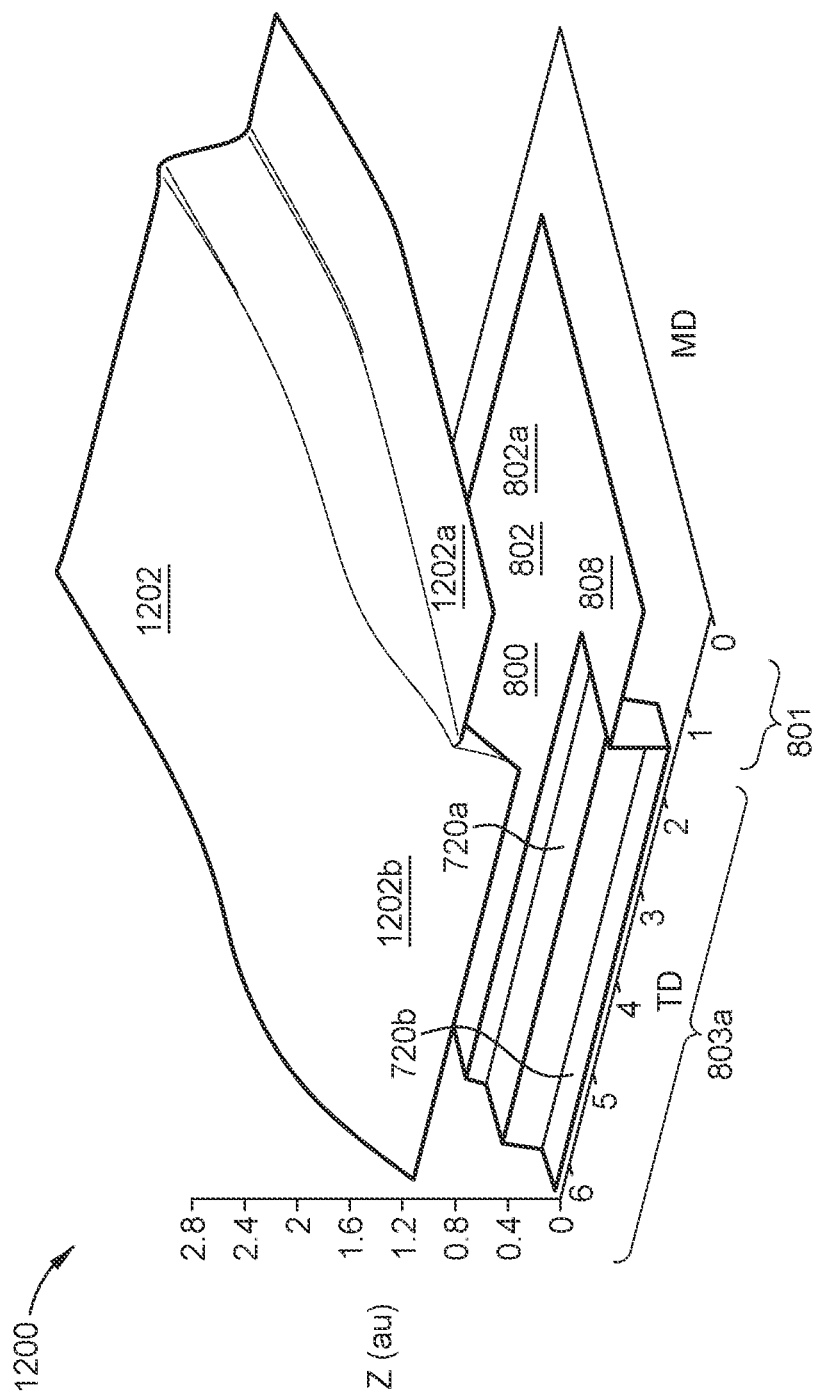
FIG. 12 illustrates a graphical representation of a tape moving over the module of FIGS. 8A-8B, according to one embodiment.

FIG. 12 illustrates a graphical representation 1200 of a tape 1202 moving over the module 800 of FIGS. 8A-8B during operation, according to one embodiment. Only the first side region 803a and the central region 801 of the module 800 are shown for clarity. Moreover, while only the module 800 of FIGS. 8A-8B, any other modules 500, 600, 700, 900, 1000, and 1100 would look similar. In the graphical representation 1200, the y-axis represents the transversal direction (TD) of the tape 1202, the x-axis represents the machine direction (MD) of the tape over the module 800, and the z-axis represents an arbitrary unit (AU) of length in the z-direction.

As shown in FIG. 12, as the tape moves over the central region 801, a first portion 1202a of the tape 1202 is disposed closer to the MFS of the module 800 than a second portion 1202b of the tape 1202 is disposed from the first side region 803a. The close distance or low clearance of the first portion 1202a of the tape 1202 over the central region 810 is needed for best magnetic recording. The further distance or high clearance of second portion 1202b of the tape 1202 over the side regions 803a, 803b increases the reliability of the tape 1202 by reducing both the contact pressure and friction. The tape 1202 being disposed closer to the central region 801 than to the side region 803a is due to the side region 803a comprising the steps 720a, 702b, as the steps 720a, 720b reduce the pressurization of incoming air, thus reducing the fly height or clearance of the tape 1202 over the central region 801.

Therefore, by utilizing a closure and/or substrate having recessed side portion disposed on a leading edge, the fly height clearance of a tape is increased in the recessed side portions and decreased in a central portion of the leading edge of the closure. As such, friction and contact force exerted on the tape is minimized, ensuring the long-term reliability of the magnetic reader and writer.

In one embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, the first side portion being recessed from the MFS, a second side portion disposed at the leading edge, the second side portion being recessed from the MFS, and a central portion disposed between the first and second side portions at the leading edge, the central portion comprising a notch.

The notch is recessed from the MFS. The notch is disposed at the MFS. The first and second side portions are tapered. The first and second side portions are disposed at an angle of about 0.1 degrees to about 5 degrees with respect to the MFS. The first and second side portions are rounded. The first and second side portions have a radius of curvature of about 0.1 mm to about 10 mm. A tape drive comprises the tape head module.

In another embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, a second side portion disposed at the leading edge, wherein the first and second side portions each individually comprises a first step recessed from the MFS and a second step recessed from the MFS, and a central portion disposed between the first and second side portions at the leading edge, the central portion being at least partially recessed from the MFS.

The central portion is entirely recessed from the MFS a distance of about 0.1 μm to about 10 μm. The central portion comprises a notch disposed at the MFS and a tapered portion recessed from the MFS. The tapered portion is disposed at an angle of about 0.1 degrees to about 0.5 degrees with respect to the MFS, and wherein the notch has a width of about 1 mm to about 6 mm. The first step is recessed a distance of about 0.2 μm to about 1 μm from the MFS, and wherein the second step is recessed a distance of about 0.5 μm to about 2.5 μm from the MFS. A tape drive comprises the tape head module.

In yet another embodiment, a tape head module comprises a substrate, a plurality of data heads disposed adjacent to the substrate at a media facing surface (MFS), the plurality of data heads being one or more of write heads and read heads, and a closure disposed adjacent to the plurality of data heads, the closure comprising: a first side portion disposed at a leading edge, a second side portion disposed at the leading edge, wherein the first and second side portions each individually comprises a first step recessed from the MFS and a second step recessed from the MFS, and a central portion disposed between the first and second side portions at the leading edge, the central portion comprising a third step recessed from the MFS and a fourth step recessed from the MFS.

The first and second steps are recessed further from the MFS than the third and fourth steps. The third and fourth steps are recessed further from the MFS than the first and second steps. The first step is recessed a distance of about 0.2 μm to about 1 μm from the MFS, and wherein the second step is recessed a distance of about 0.5 μm to about 2 μm from the MFS. The third step is recessed a distance of about 0.6 μm to about 2.5 μm from the MFS, and wherein the fourth step is recessed a distance of about 1 μm to about 13 μm from the MFS. The third step is recessed a distance of about 0.05 μm to about 0.15 μm from the MFS, and wherein the fourth step is recessed a distance of about 0.155 μm to about 0.2 μm from the MFS. A tape drive comprises the tape head module.

While the foregoing is directed to embodiments of the present disclosure, other and further embodiments of the disclosure may be devised without departing from the basic scope thereof, and the scope thereof is determined by the claims that follow.

What is claimed is:

1. A tape head module, comprising:
   a substrate;
   a plurality of data heads disposed adjacent to the substrate at a media facing surface (MFS), the plurality of data heads being one or more of write heads and read heads; and
   a closure disposed adjacent to the plurality of data heads, the closure comprising:
      a first side portion disposed at a leading edge, the first side portion being recessed from the MFS;
      a second side portion disposed at the leading edge, the second side portion being recessed from the MFS, wherein the first and second side portions each individually comprises a first step recessed from the MFS and a second step recessed from the MFS; and
      a central portion disposed between the first and second side portions at the leading edge, the central portion comprising a notch.

2. The tape head module of claim 1, wherein the notch is recessed from the MFS.

3. The tape head module of claim 1, wherein the notch is disposed at the MFS.

4. A tape drive comprising the tape head module of claim 1.

5. The tape head module of claim 1, wherein the central portion further comprises one or more steps.

6. The tape head module of claim 1, wherein the central portion further comprises a tapered portion.

7. The tape head module of claim 6, wherein the tapered portion is disposed at an angle of about 0.1 degrees to about 2 degrees with respect to the MFS.

8. The tape head module of claim 1, wherein the first step is recessed a distance of about 0.2 μm to about 2.5 μm from the MFS, and wherein the second step is recessed a distance of about 0.5 μm to about 5 μm from the MFS.

9. A tape head module, comprising:
   a substrate;
   a plurality of data heads disposed adjacent to the substrate at a media facing surface (MFS), the plurality of data heads being one or more of write heads and read heads; and
   a closure disposed adjacent to the plurality of data heads, the closure comprising:
      a first side portion disposed at a leading edge;
      a second side portion disposed at the leading edge, wherein the first and second side portions each individually comprises a first step recessed from the MFS and a second step recessed from the MFS; and
      a central portion disposed between the first and second side portions at the leading edge, the central portion being at least partially recessed from the MFS.

10. The tape head module of claim 9, wherein the central portion is entirely recessed from the MFS a distance of about 0.1 μm to about 10 μm.

11. The tape head module of claim 9, wherein the central portion comprises a notch disposed at the MFS and a tapered portion recessed from the MFS.

12. The tape head module of claim 11, wherein the tapered portion is disposed at an angle of about 0.1 degrees to about 0.5 degrees with respect to the MFS, and wherein the notch has a width of about 1 mm to about 6 mm.

13. The tape head module of claim 9, wherein the first step is recessed a distance of about 0.2 µm to about 1 µm from the MFS, and wherein the second step is recessed a distance of about 0.5 µm to about 2.5 µm from the MFS.

14. A tape drive comprising the tape head module of claim 9.

15. A tape head module, comprising:
a substrate;
a plurality of data heads disposed adjacent to the substrate at a media facing surface (MFS), the plurality of data heads being one or more of write heads and read heads; and
a closure disposed adjacent to the plurality of data heads, the closure comprising:
  a first side portion disposed at a leading edge;
  a second side portion disposed at the leading edge, wherein the first and second side portions each individually comprises a first step recessed from the MFS and a second step recessed from the MFS; and
  a central portion disposed between the first and second side portions at the leading edge, the central portion comprising a third step recessed from the MFS and a fourth step recessed from the MFS.

16. The tape head module of claim 15, wherein the first and second steps are recessed further from the MFS than the third and fourth steps.

17. The tape head module of claim 15, wherein the third and fourth steps are recessed further from the MFS than the first and second steps.

18. The tape head module of claim 15, wherein the first step is recessed a distance of about 0.2 µm to about 1 µm from the MFS, and wherein the second step is recessed a distance of about 0.5 µm to about 2 µm from the MFS.

19. The tape head module of claim 15, wherein the third step is recessed a distance of about 0.6 µm to about 2.5 µm from the MFS, and wherein the fourth step is recessed a distance of about 1 µm to about 3 µm from the MFS.

20. The tape head module of claim 15, wherein the third step is recessed a distance of about 0.05 µm to about 0.15 µm from the MFS, and wherein the fourth step is recessed a distance of about 0.155 µm to about 0.2 µm from the MFS.

21. A tape drive comprising the tape head module of claim 15.

* * * * *